United States Patent
Zhang et al.

(10) Patent No.: US 12,446,079 B2
(45) Date of Patent: Oct. 14, 2025

(54) METHODS TO ESTABLISH A PROTOCOL DATA UNIT SESSION

(71) Applicant: QUALCOMM Incorporated, San Diego, CA (US)

(72) Inventors: Hao Zhang, Shanghai (CN); Wei He, Shanghai (CN); Chaofeng Hui, Beijing (CN); Jian Li, Shanghai (CN); Fojian Zhang, Shenzhen (CN); Tianya Lin, Shanghai (CN); Jing Zhou, Shanghai (CN); Yuankun Zhu, Shanghai (CN); Yi Liu, Shenzhen (CN)

(73) Assignee: QUALCOMM Incorporated, San Diego, CA (US)

( * ) Notice: Subject to any disclaimer, the term of this patent is extended or adjusted under 35 U.S.C. 154(b) by 401 days.

(21) Appl. No.: 17/997,357

(22) PCT Filed: May 28, 2020

(86) PCT No.: PCT/CN2020/092930
§ 371 (c)(1),
(2) Date: Oct. 27, 2022

(87) PCT Pub. No.: WO2021/237572
PCT Pub. Date: Dec. 2, 2021

(65) Prior Publication Data
US 2023/0180309 A1  Jun. 8, 2023

(51) Int. Cl.
*H04W 76/10* (2018.01)
*H04W 8/18* (2009.01)
(Continued)

(52) U.S. Cl.
CPC ......... *H04W 76/10* (2018.02); *H04W 40/248* (2013.01); *H04W 48/18* (2013.01); *H04W 8/183* (2013.01); *H04W 88/06* (2013.01)

(58) Field of Classification Search
None
See application file for complete search history.

(56) References Cited

U.S. PATENT DOCUMENTS

2017/0339609 A1* 11/2017 Youn ................. H04W 76/11
2018/0132289 A1   5/2018 Zhao et al.
(Continued)

FOREIGN PATENT DOCUMENTS

| CN | 108495112 A | 9/2018 |
|---|---|---|
| CN | 109286567 A | 1/2019 |

(Continued)

OTHER PUBLICATIONS

Huawei, et al., "KI#1 KI#3, New Sol: N3GPP for MUSIM Service Concurrency," 3GPP TSG-WG SA2 Meeting #139E e-meeting, S2-2003975, 3rd Generation Partnership Project, Mobile Competence Centre, 650, Route Des Lucioles, F-06921 Sophia-Antipolis Cedex, France, vol. SA WG2, No. Elbonia, e-meeting, Jun. 1, 2020-Jun. 12, 2020, May 22, 2020, XP051889982, pp. 1-6, p. 2, line 11-line 15, p. 2, line 1-line 10.

(Continued)

*Primary Examiner* — Jay L Vogel
(74) *Attorney, Agent, or Firm* — Holland & Hart LLP/Qualcomm

(57) ABSTRACT

Methods, systems, and devices for wireless communications are described. A user equipment (UE) may identify that it is operating in a dual-subscription mode that includes a first subscription and a second subscription. In some cases, the UE may include an application that is requesting to establish a data connection in accordance with an access preference rule for the application. The UE may determine that the access preference rule lacks a match among policies of a first route selection policy associated with the first subscription (e.g., a default subscription). The UE may then evaluate a second route selection policy associated with the second (Continued)

subscription for a policy that matches the access preference rule based on determining the lack of the match among policies of the first route selection policy. The UE may establish the data connection after evaluating the second route selection policy for the matching policy.

26 Claims, 13 Drawing Sheets

(51) Int. Cl.
  *H04W 40/24* (2009.01)
  *H04W 48/18* (2009.01)
  *H04W 88/06* (2009.01)

(56) References Cited

U.S. PATENT DOCUMENTS

| | | | | |
|---|---|---|---|---|
| 2018/0313929 | A1* | 11/2018 | Bitra | G01S 5/021 |
| 2019/0116488 | A1* | 4/2019 | Kumar | H04W 4/24 |
| 2021/0051562 | A1* | 2/2021 | Huang-Fu | H04W 40/02 |
| 2023/0072956 | A1* | 3/2023 | Ding | H04L 41/0894 |

FOREIGN PATENT DOCUMENTS

| | | | | |
|---|---|---|---|---|
| CN | 110557798 | A | | 12/2019 |
| CN | 111182572 | A | | 5/2020 |
| WO | WO-2019114684 | A1 | | 6/2019 |
| WO | WO-2020030180 | A1 | | 2/2020 |
| WO | WO-2020256189 | A1 * | | 12/2020 |
| WO | WO-2021185063 | A1 * | 9/2021 | H04L 12/1403 |

OTHER PUBLICATIONS

Interdigital Inc: "Update to Solution 1 in TR 23.758 "Provisioning URSP configuration to the UE to Establish PDU Sessions for Edge Applications" based on PvDs", SA WG2 Meeting #139-e, S2-2004231, 3rd Generation Partnership Project, Mobile Competence Centre, 650, Route Des Lucioles, F-06921 Sophia-Antipolis Cedex, France, vol. SA WG2, No. Elbonia, Jun. 13, 2020-Jun. 17, 2020, May 22, 2020, XP052461027, The whole document.

Motorola Mobility, et al., "Network Initiated MA PDTJ Session Establishment", SA WG2 Meeting #132, S2-1903360, 3rd Generation Partnership Project, Mobile Competence Centre, 650, Route Des Lucioles, F-06921 Sophia-Antipolis Cedex, France, vol. SA WG2, No. Xi'an, P.R. China, Apr. 8, 2019-Apr. 12, 2019, Apr. 2, 2019, XP051719523, The whole document.

Supplementary European Search Report—EP20938159—Search Authority—Munich—Jan. 30, 2024 (204431EP).

"3rd Generation Partnership Project; Technical Specification Group Services and System Aspects; Policy and Charging Control Framework for the 5G System (5GS); Stage 2 (Release 16)", 3GPP TS 23.503 V16.4.1, Apr. 30, 2020, pp. 1-110, pp. 29-31, 97-98.

International Search Report and Written Opinion—PCT/CN2020/092930—ISA/EPO—Feb. 25, 2021 (204431WO1).

Qualcomm Incorporated: "Network Controlled RAT Selection Based on Application Awareness", fse 3GPP TSG-WG2 Meeting #127, S2-186252, Jun. 2, 2018 (Jun. 2, 2018), 6 Pages, the whole document.

* cited by examiner

METHODS TO ESTABLISH A PROTOCOL DATA UNIT SESSION

CROSS REFERENCE

The present Application is a 371 national stage filing of International PCT Application No. PCT/CN2020/092930 by Zhang et al. entitled "METHODS TO ESTABLISH A PROTOCOL DATA UNIT SESSION," filed May 28, 2020, which is assigned to the assignee hereof, and which is expressly incorporated by reference in its entirety herein.

FIELD OF TECHNOLOGY

The following relates generally to wireless communications and more specifically to methods to establish a protocol data unit (PDU) session.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A wireless multiple-access communications system may include one or more base stations or one or more network access nodes, each simultaneously supporting communication for multiple communication devices, which may be otherwise known as a UE. In some wireless communications systems, a UE may support communications with a base station using multiple radio access technologies (RATs), such as 5G, LTE, etc. Improved techniques at a UE for communicating with a base station using one or more RATs may be desirable.

SUMMARY

The described techniques relate to improved methods, systems, devices, and apparatuses that support methods to establish a protocol data unit (PDU) session. Generally, the described techniques provide for establishing wireless connections for a user equipment (UE) that supports communications with a base station using multiple radio access technologies (RATs) (e.g., a dual subscription dual standby (DSDS) UE). A DSDS UE may operate in a dual subscription mode, where each subscription corresponds to a subscriber identity module (SIM) of the UE. The UE may establish a data connection via a first subscription or a second subscription. When an application of the UE requests to establish a data connection with the network, the application may indicate an access preference rule to use when establishing the connection. To establish the connection, the UE may compare the access preference rule of the application to policies of a UE Route Selection Policy (URSP) associated with a default subscription (e.g., the first subscription). If the UE determines that the access preference rule of the application lacks a match among policies of the URSP associated with the default subscription, the UE may evaluate the URSP of the second subscription for a policy that matches the access preference rule of the application. If there is a match, the UE may update the default subscription to the second subscription and may establish a connection with the network via the second subscription. In some cases, the UE may prompt a user to determine whether to switch the default subscription to the second subscription. Here, the UE may refrain from switching the default subscription to the second subscription if the user indicates to maintain the default subscription as the first subscription.

A method of wireless communication at a UE is described. The method may include identifying that the UE is operating in a dual-subscription mode that includes a first subscription and a second subscription and that the UE includes an application that is requesting to establish a data connection in accordance with an access preference rule for the application, determining that the access preference rule lacks a match among policies of a first route selection policy associated with the first subscription, evaluating, based on the lack of the match among policies of the first route selection policy, a second route selection policy associated with the second subscription for a matching policy that matches the access preference rule, and establishing the data connection after evaluating the second route selection policy.

An apparatus for wireless communication at a UE is described. The apparatus may include a processor, memory coupled with the processor, and instructions stored in the memory. The instructions may be executable by the processor to cause the apparatus to identify that the UE is operating in a dual-subscription mode that includes a first subscription and a second subscription and that the UE includes an application that is requesting to establish a data connection in accordance with an access preference rule for the application, determine that the access preference rule lacks a match among policies of a first route selection policy associated with the first subscription, evaluate, based on the lack of the match among policies of the first route selection policy, a second route selection policy associated with the second subscription for a matching policy that matches the access preference rule, and establish the data connection after evaluating the second route selection policy.

Another apparatus for wireless communication at a UE is described. The apparatus may include means for identifying that the UE is operating in a dual-subscription mode that includes a first subscription and a second subscription and that the UE includes an application that is requesting to establish a data connection in accordance with an access preference rule for the application, determining that the access preference rule lacks a match among policies of a first route selection policy associated with the first subscription, evaluating, based on the lack of the match among policies of the first route selection policy, a second route selection policy associated with the second subscription for a matching policy that matches the access preference rule, and establishing the data connection after evaluating the second route selection policy.

A non-transitory computer-readable medium storing code for wireless communication at a UE is described. The code may include instructions executable by a processor to identify that the UE is operating in a dual-subscription mode that includes a first subscription and a second subscription and that the UE includes an application that is requesting to establish a data connection in accordance with an access preference rule for the application, determine that the access preference rule lacks a match among policies of a first route selection policy associated with the first subscription, evaluate, based on the lack of the match among policies of the first route selection policy, a second route selection policy associated with the second subscription for a matching policy that matches the access preference rule, and establish the data connection after evaluating the second route selection policy.

Some examples of the method, apparatuses, and non-transitory computer-readable medium described herein may further include operations, features, means, or instructions for determining that the second route selection policy includes the matching policy that matches the access preference rule based on the evaluating, where the data connection may be established via the second subscription based on the second route selection policy including the matching policy.

Some examples of the method, apparatuses, and non-transitory computer-readable medium described herein may further include operations, features, means, or instructions for updating a default subscription of the UE from the first subscription to the second subscription based on the second route selection policy including the matching policy.

Some examples of the method, apparatuses, and non-transitory computer-readable medium described herein may further include operations, features, means, or instructions for prompting a user of the UE to select, from the first subscription and the second subscription, a default subscription of the UE based on determining that the second route selection policy includes the matching policy, and receiving, from the user, an indication of the second subscription, where the default subscription of the UE may be updated to the second subscription based on receiving the indication of the second subscription from the user.

Some examples of the method, apparatuses, and non-transitory computer-readable medium described herein may further include operations, features, means, or instructions for establishing the data connection via the second subscription based on updating a default subscription of the UE from the first subscription to the second subscription, the updating based on the second route selection policy including the matching policy.

Some examples of the method, apparatuses, and non-transitory computer-readable medium described herein may further include operations, features, means, or instructions for determining that the second route selection policy includes the matching policy that matches the access preference rule based on the evaluating, maintaining the first subscription as a default subscription of the UE after determining that the second route selection policy includes the matching policy, and establishing the data connection via the first subscription based on determining to maintain the first subscription as the default subscription of the UE.

Some examples of the method, apparatuses, and non-transitory computer-readable medium described herein may further include operations, features, means, or instructions for prompting a user of the UE to select, from the first subscription and the second subscription, the default subscription of the UE based on determining that the second route selection policy includes the matching policy, and receiving, from the user, an indication of the first subscription, where maintaining the first subscription as the default subscription of the UE may be based on receiving the indication of the first subscription from the user.

Some examples of the method, apparatuses, and non-transitory computer-readable medium described herein may further include operations, features, means, or instructions for selecting, from the policies of the first route selection policy, a default policy for the application, where establishing the data connection via the first subscription may be based on the default policy.

Some examples of the method, apparatuses, and non-transitory computer-readable medium described herein may further include operations, features, means, or instructions for determining that the second route selection policy lacks the matching policy that matches the access preference rule based on the evaluating, and establishing the data connection via the first subscription based on the second route selection policy lacking the matching policy.

Some examples of the method, apparatuses, and non-transitory computer-readable medium described herein may further include operations, features, means, or instructions for selecting, from the policies of the first route selection policy, a default policy for the application, where establishing the data connection via the first subscription may be based on the default policy.

Some examples of the method, apparatuses, and non-transitory computer-readable medium described herein may further include operations, features, means, or instructions for identifying that the first subscription may be a default subscription for the UE, and evaluating the first route selection policy for the matching policy based on the first subscription being the default subscription.

In some examples of the method, apparatuses, and non-transitory computer-readable medium described herein, the first subscription may be configured to provide a first data connection associated with a first quality of service for the application and the second subscription may be configured to provide a second data connection associated with a second quality of service for the application, the second quality of service being of higher quality than the first quality of service.

In some examples of the method, apparatuses, and non-transitory computer-readable medium described herein, establishing the data connection further may include operations, features, means, or instructions for transmitting a PDU establishment request message to a core network to establish the data connection, and receiving a PDU establishment accept message from the core network based at least in on transmitting the PDU establishment request message.

In some examples of the method, apparatuses, and non-transitory computer-readable medium described herein, the PDU establishment request message includes a data network name, a PDU session type, a session and service continuity mode, or a combination thereof.

DETAILED DESCRIPTION

Figure 1:
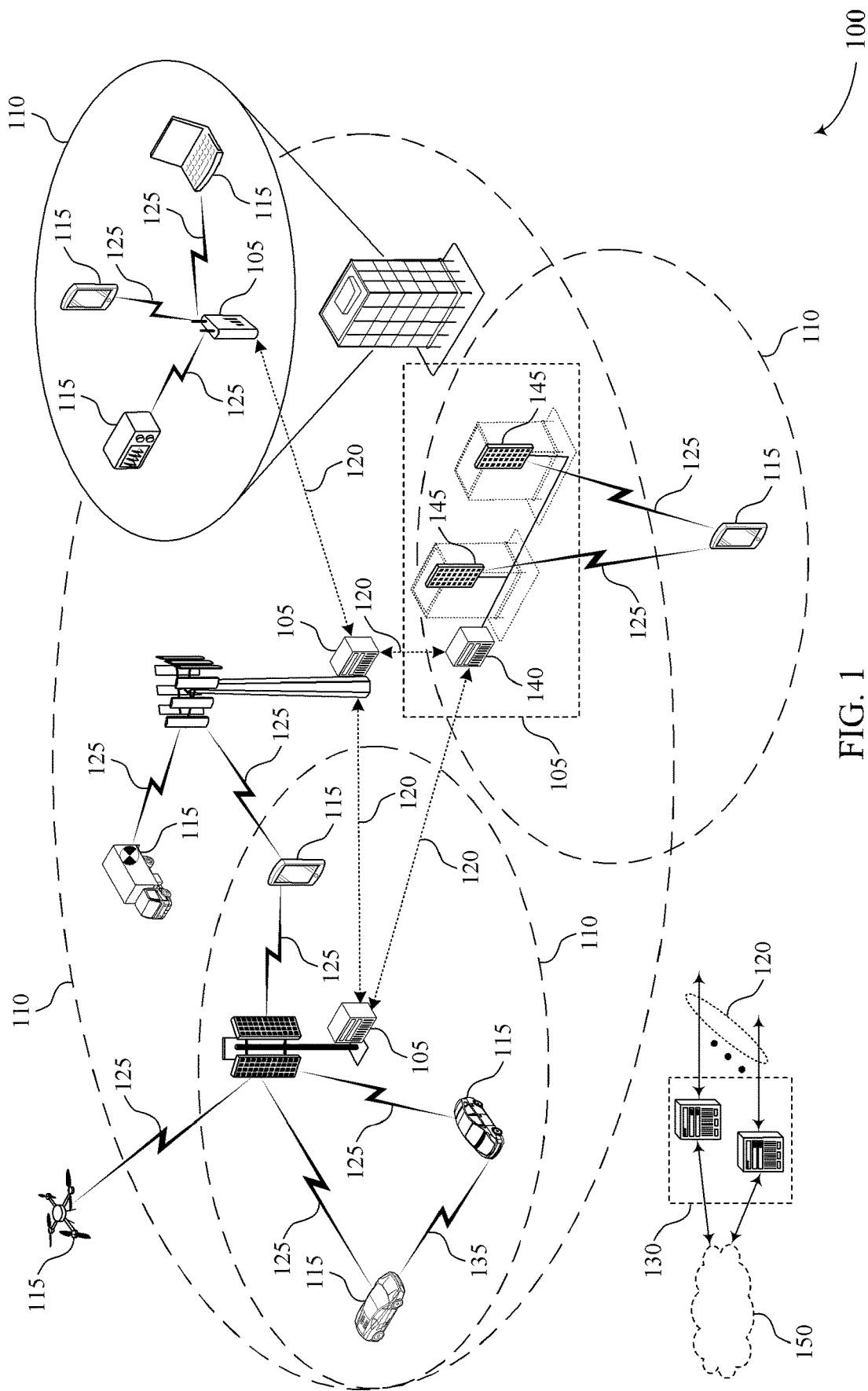
FIG. 1 illustrates an example of a system for wireless communications that supports methods to establish a protocol data unit (PDU) session in accordance with aspects of the present disclosure.

In some wireless communications systems, a user equipment (UE) may have two subscriptions, each corresponding to a subscriber identity module (SIM) of the UE. A UE with two subscriptions may be referred to as a dual subscription dual standby (DSDS) UE. The UE may establish a connection (e.g., a protocol data unit (PDU) session) with a network via a first subscription or a second subscription. When an application of the UE requests to establish a connection with the network, the application may indicate an access preference rule to use when establishing the connection. To establish the connection, the UE may compare the access preference rule of the application to policies of a UE Route Selection Policy (URSP) of the default subscription (e.g., the first subscription). If the access preference rule does not match any of the policies of the URSP of the default subscription, the UE may select a default policy of the URSP of the first subscription and establish a connection with the network via the first subscription. In some cases, the default policy of the URSP may provide a relatively basic level of service (e.g., relatively low bandwidth, relatively high latency) when compared to other policies of the URSP.

In some cases, the access preference rule of the application may match a policy of the URSP of the second subscription and the second subscription may provide a better connection for the application (e.g., when compared to the first subscription). However, because the second subscription is not the current default subscription of the UE, the UE may not evaluate the URSP of the second subscription for a policy that matches the access preference rule of the application. Thus, the UE may use a first connection to the network via the first subscription instead of a second connection to the network via the second subscription that provides a higher quality of service for the application when compared to the first connection via the first subscription.

In some other cases, if the UE determines that an access preference rule of an application lacks a match among policies of the URSP associated with the default subscription, the UE may then evaluate the URSP of the second subscription for a policy that matches the access preference rule (e.g., instead of selecting a default policy of the URSP associated with the default subscription). If there is a match, the UE may update the default subscription to the second subscription and may optionally establish a connection with the network via the second subscription. In some cases, establishing the connection with the network via the second subscription may provide a higher quality of service for the application when compared to a connection established with the network via the first subscription. In some instances, the UE may not automatically update the default subscription to the second subscription if there is a match and may instead prompt a user to determine whether to update the default subscription.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to methods to establish a PDU session.

FIG. 1 illustrates an example of a wireless communications system 100 that supports methods to establish a PDU session in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, a UE 115 in the wireless communications system 100 may be operating in a dual-subscription mode that includes a first subscription and a second subscription. In some cases, an application of the UE 115 may request to establish a data connection (e.g., a PDU session) according to an access preference rule for the application. The UE 115 may evaluate policies of the URSP associated with a default subscription (e.g., the first subscription) to determine if there is a policy within the URSP associated with the default subscription that matches the access preference rule for the application. If the UE 115 determines that there is no matching policy within the URSP associated with the default subscription, the UE 115 may evaluate the URSP of the second subscription for a policy that matches the access preference rule. If there is a match, the UE 115 may update the default subscription to the second subscription and may establish a connection with the network via the second subscription. For example, the UE 115 may prompt a user to determine whether to update the default subscription to the second subscription. If the user indicates to update the default subscription, the UE 115 may update the default subscription to the second subscription accordingly. The UE 115 may then establish a data connection via the second subscription according to the access preference rule for the application. In some other cases, the user may indicate to maintain the first subscription as the default subscription. Here, the UE 115 may select a default policy of the URSP associated with first subscription and establish the data connection via the first subscription according to the default policy.

Figure 2:
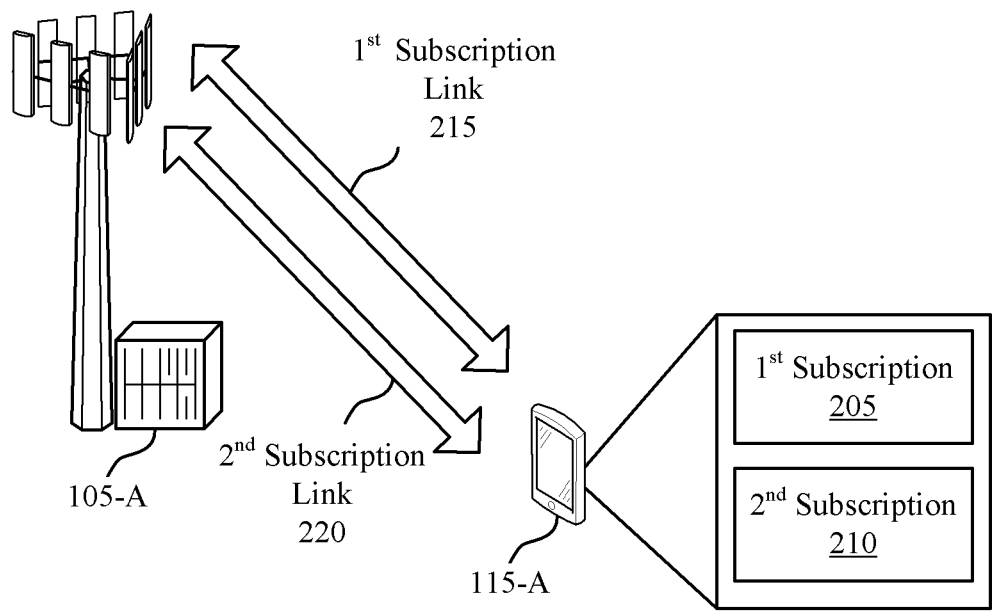
FIG. 2 illustrates an example of a wireless communications system that supports methods to establish a PDU session in accordance with aspects of the present disclosure.

FIG. 2 illustrates an example of a wireless communications system 200 that supports methods to establish a PDU session in accordance with aspects of the present disclosure. In some examples, wireless communications system 200 may implement aspects of wireless communications system 100. The wireless communications system 200 may include UE 115-a and a base station 105-a, which may be respective examples of a UE 115 and a base station 105 as described with reference to FIG. 1.

UE 115-a may support multiple subscriptions and may be referred to as a multi-SIM UE 115-a or a DSDS UE 115-a. For example, UE 115-a may include a first subscription 205 and a second subscription 210. Additionally, UE 115-a may include more than one SIM. For example, first subscription 205 may be associated with a first SIM of UE 115-a and second subscription 210 may be associated with a second SIM of UE 115-a. UE 115-a may communicate with a base station 105-a via first subscription 205 and second subscription 210. In some cases, first subscription 205 and second subscription 210 communicate with the base station 105-a via different radio access technologies (RATs). For example, first subscription 205 may be associated with a first RAT (e.g., NR, LTE, wireless local area network (WLAN), NB-IoT) and second subscription 210 may operate using a different RAT.

UE 115-a may communicate with base station 105-a by a first subscription link 215 or a second subscription link 220. In some cases, the first subscription link 215 may be associated with the first subscription 205 and the second subscription link 220 may be associated with the second subscription 210. First subscription link 215 and second subscription link 220 may be examples of a communication link 125 as described with respect to FIG. 1.

UE 115-a may include one or more applications. In some cases, the applications may request to establish a data connection with base station 105-*a*. For example, the application may transmit data to base station 105-*a* or receive data from base station 105-*a* by the data connection. When requesting to establish the data connection, the application may additionally indicate an access preference rule to UE 115-*a*. For example, the application may indicate one or more traffic descriptors (e.g., IP descriptors, Non-IP descriptors, application identifiers, domain descriptors, a data network name (DNN), connection capabilities) with associated precedence values or one or more route selection descriptors (e.g., session and service continuity mode, PDU session type, DNN, single-network slice selection assistance information (S-NSSAI), access type preference, multi-access preference, non-seamless offload indication, time window, location criteria) with associated precedence values. That is, the access preference rule may indicate a preferential method for routing traffic associated with the application.

To establish the data connection for the application in response to the request, UE 115-*a* may evaluate a URSP associated with a current default subscription (e.g., first subscription 205 or second subscription 210). That is, both the first subscription 205 and the second subscription 210 may be associated with a unique URSP. The URSP may include a precedence value of the URSP identifying the precedence of the URSP among all the existing URSPs, one or more traffic descriptors, and one or more route selection descriptors. If a policy of the URSP matches the access preference rule of the application, UE 115-*a* may preferentially route and filter traffic associated with the application to the base station 105-*a* and provide a higher quality of service (e.g., higher throughput) than if the access preference rule lacks a match among policies of the URSP. For example, if the access preference rule lacks a match to the URSP, then UE 115-*a* may establish the data connection using a default policy that provides a lower quality of service (e.g., lower throughput) than a quality of service provided by a matching policy. In some cases, UE 115-*a* may determine whether the access preference rule matches a policy of the URSP by comparing parameters of the access preference rule (e.g., the traffic descriptors and route selection descriptors and associated precedence values) to parameters of the URSP (e.g., the precedence value, traffic descriptors, and route selection descriptors) and determining if they match.

In some cases, UE 115-*a* may determine that an access preference rule indicated by an application requesting to establish a data connection with base station 105-*a* lacks a match among policies of the URSP of the default subscription. For example, if first subscription 205 is a current default subscription, UE 115-*a* may determine that the URSP associated with first subscription 205 does not include a policy that matches the access preference rule.

After determining that none of the policies of the URSP associated with first subscription 205 (e.g., the current default subscription) do not match the access preference rule, UE 115-*a* may evaluate policies of a URSP of second subscription 210 for a policy that matches the access preference rule. In some cases, UE 115-*a* may determine that the URSP of second subscription 210 lacks a policy that matches the access preference rule. Here, UE 115-*a* may select a default policy from the URSP of first subscription 205 for the application and establish the data connection via first subscription link 215 according to the default policy. In some other cases, UE 115-*a* may determine that the URSP of second subscription 210 includes a policy that matches the access preference rule.

After determining that the URSP of second subscription 210 includes a policy that matches the access preference rule (e.g., of the application requesting to establish a data connection), UE 115-*a* may prompt a user of UE 115-*a* to select a default subscription for communications with base station 105-*a*. That is, UE 115-*a* may prompt the user to select first subscription 205 or second subscription 210 for establishing the data connection. Then, UE 115-*a* may receive an indication from the user of the selected default subscription.

In one example, UE 115-*a* may receive an indication from the user of second subscription 210. That is, the user may select second subscription 210 as the default subscription. In this example, UE 115-*a* may update the default subscription from the first subscription 205 to second subscription 210. UE 115-*a* may then establish the data connection via second subscription link 220 according to the policy of the URSP that matches the access preference rule. For example, UE 115-*a* may transmit a PDU establishment request message to base station 105-*a* to establish the data connection via second subscription link 220 and receive a PDU establishment accept message from base station 105-*a* in response to transmitting the PDU establishment request message.

In another example, UE 115-*a* may receive an indication from the user indicating first subscription 205. That is, the user may select first subscription 205 as the default subscription. Here, UE 115-*a* may maintain first subscription 205 as the default subscription. UE 115-*a* may then select a default policy from the policies within the URSP of first subscription 205 for establishing the data connection for the application. UE 115-*a* may then establish the data connection via first subscription 205 according to the default policy. For example, UE 115-*a* may transmit a PDU establishment request message to base station 105-*a* to establish the data connection via first subscription link 215 and receive a PDU establishment accept message from base station 105-*a* in response to transmitting the PDU establishment request message.

Figure 3:
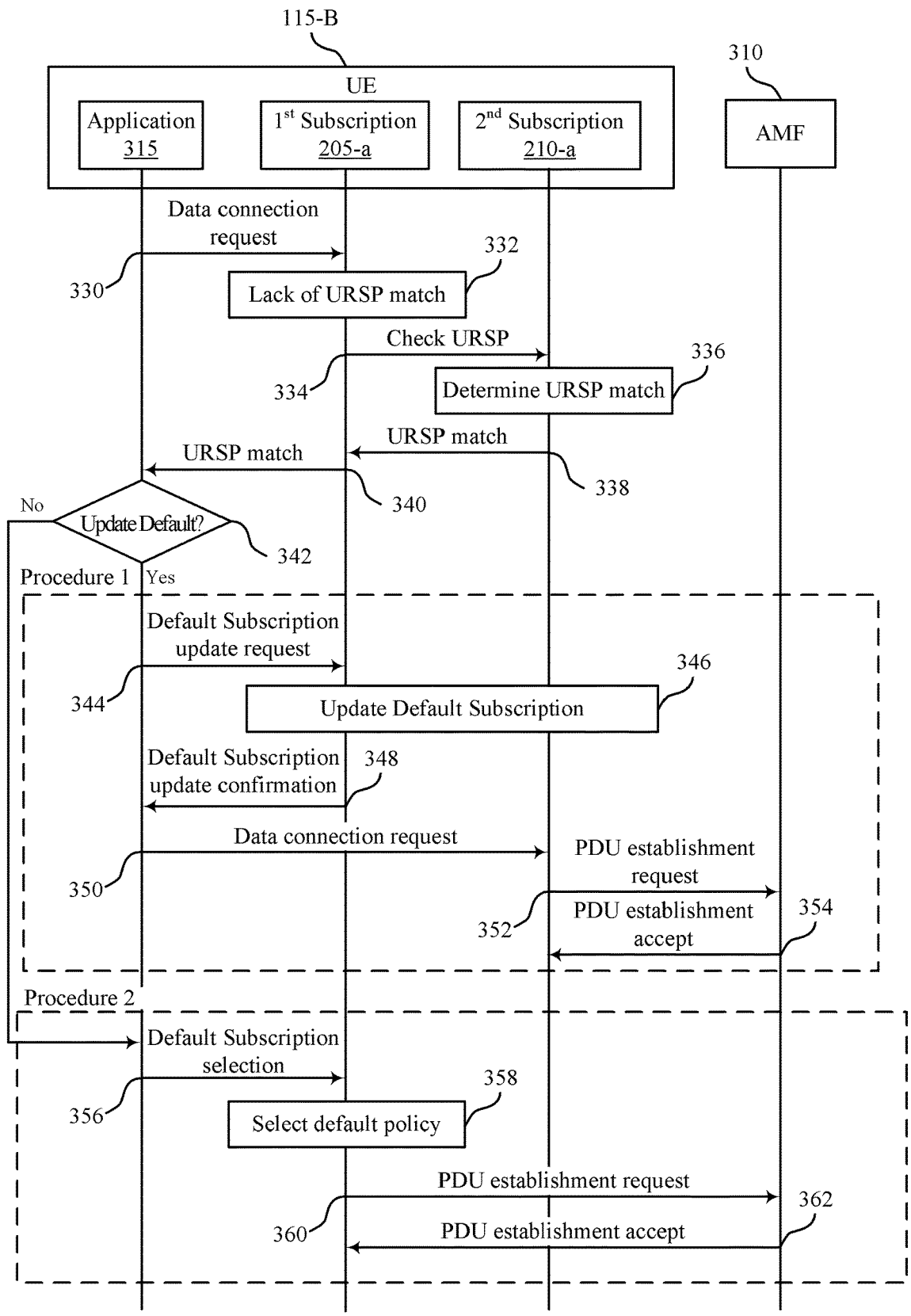
FIG. 3 illustrates an example of a process flow that supports methods to establish a PDU session in accordance with aspects of the present disclosure.

FIG. 3 illustrates an example of a process flow 300 that supports methods to establish a PDU session in accordance with aspects of the present disclosure. In some examples, process flow 300 may implement aspects of wireless communications system as described with reference to FIGS. 1 and 2. For example, UE 115-*b* may be an example of the UEs 115 as described with respect to FIGS. 1 and 2. Additionally, UE 115-*b* may include a first subscription 205-*a* and a second subscription 210-*a*, which may be examples of first subscription 205 and second subscription 210 as described with reference to FIGS. 1 and 2. In some cases, UE 115-*b* may include a first SIM and a second SIM, where the first SIM is associated with first subscription 205-*a* and the second SIM is associated with second subscription 210-*a*. UE 115-*b* may communicate with AMF 310 (e.g., via a base station), which may be an example of core network 130 as described with respect to FIG. 1.

At 330, application 315 may request to establish a data connection with a network. That is, application 315 may transmit an indication of the data connection request to the current default subscription of the UE 115-*b*, first subscription 205-*a*. Application 315 may additionally indicate an access preference rule to use when establishing the data connection (e.g., within the data connection request).

At 332, first subscription 205-*a* may determine that the first URSP lacks a policy that matches the access preference rule. For example, first subscription 205-*a* may compare parameters of the access preference rule (e.g., the traffic descriptors and route selection descriptors and associated precedence values) to parameters of the URSP policies (e.g., the precedence value, traffic descriptors, and route selection descriptors) and determine that the parameters of the access preference rule do not match parameters of a policy within the URSP.

At 334, first subscription 205-*a* may communicate an indication to second subscription 210-*a* to evaluate policies of the second URSP for a policy that matches the access preference rule indicated by application 315. For example, first subscription 205-*a* may send a check policy request message to second subscription 210-*a* indicating for second subscription 210-*a* to evaluate policies of the second URSP for the matching policy. In some cases, first subscription 205-*a* may communicate the indication to second subscription 210-*a* by the first SIM forwarding the check policy request message to the second SIM.

At 336, second subscription 210-*a* may determine that the second URSP includes a policy that matches the access preference rule. For example, second subscription 210-*a* compare parameters of the access preference rule to parameters of the URSP policies to determine that the second URSP includes the matching policy.

At 338, second subscription 210-*a* may communicate an indication to first subscription 205-*a* that the second URSP includes the matching policy. For example, second subscription 210-*a* may send a check policy success message to first subscription 205-*a* indicating that the second URSP includes the matching policy. In some cases, second subscription 210-*a* may communicate the indication to first subscription 205-*a* by the second SIM sending the check policy success message to the first SIM.

At 340, first subscription 205-*a* may indicate, to application 315, that second subscription 210-*a* includes the matching policy. For example, first subscription 205-*a* (or the first SIM) may forward the check policy success message to application 315 indicating that second subscription 210-*a* includes the matching policy.

At 342, application 315 may prompt a user of UE 115-*b* to select a default subscription (e.g., from first subscription 205-*a* and second subscription 210-*a*) to use for establishing the data connection. For example, application 315 may ask the user whether to update the default description to second subscription 210-*a* or to maintain the default description as first subscription 205-*a*. Based on the selection of the user, process flow 300 may optionally follow a first procedure, herein referred to as Procedure 1, or a second procedure, herein referred to as Procedure 2. For example, the process flow 300 may follow Procedure 1 if the user selects to update the default subscription to second subscription 210-*a*. Additionally, the process flow 300 may follow Procedure 2 if the user selects to maintain the default subscription as first subscription 205-*a*.

For Procedure 1, at 344 application 315 may send a request to first subscription 205-*a* to update the default subscription from first subscription 205-*a* to second subscription 210-*a*. For examples, application 315 may send a default subscription update request message to first subscription 205-*a* indicating that the default subscription be updated from first subscription 205-*a* to second subscription 210-*a*. In some cases, the first SIM may receive the default subscription update request message from application 315.

At 346, UE 115-*b* may update the default subscription from first subscription 205-*a* to second subscription 210-*a*. At 348, first subscription 205-*a* may indicate to application 315 that the default subscription was updated and that application 315 may now establish the data connection via second subscription 210-*a*. For example, first subscription 205-*a* may send a default subscription update confirmation message to application 315 indicating that the default subscription was updated.

At 350, application 315 may request to establish a data connection with AMF 310 via the updated default subscription second subscription 210-*a* (e.g., in response to receiving the default subscription update configuration message). For example, application 315 may request that second subscription 210-*a* establish the data connection with AMF 310 based on UE 115-*b* updating the default subscription to second subscription 210-*a*.

UE 115-*b* may establish the data connection via second subscription 210-*a* based on receiving the request to establish the data connection from application 315. That is, at 352 UE 115-*b* may transmit a PDU establishment request message to AMF 310 via second subscription 210-*a* (e.g., by the second SIM). The PDU establishment request message may indicate to AMF 310 the matching policy to use in establishing the data connection. In some cases, the PDU establishment request message includes a DNN, PDU session type, session and service continuity mode, or any combination thereof.

At 354, AMF 310 may transmit a PDU establishment accept message to UE 115-*b* in response to the PDU establishment request via second subscription 210-*a*. Thus, UE 115-*b* may establish the data connection for application 315 via second subscription 210-*a* using the matching policy.

For Procedure 2, at 356 application 315 may indicate to first subscription 205-*a* that the user selected to maintain the default subscription as first subscription 205-*a*. For example, application 315 may send a default subscription selection message to first subscription 205-*a* indicating that the user selected to maintain the default subscription as first subscription 205-*a*. In some cases, the first SIM may receive the default subscription selection message from application 315

At 358, first subscription 205-*a* may select a default policy for application 315. In some cases, the default policy includes a "match all" descriptor that is used when establishing the data connection via first subscription 205-*a*.

UE 115-*b* may establish the data connection via first subscription 205-*a* based on receiving the default subscription selection message from application 315 For example, at 360, UE 115-*b* may transmit a PDU establishment request message to AMF 310 via first subscription 205-*a*. The PDU establishment request message may indicate to AMF 310 the selected default policy to use in establishing the data connection. In some cases, the PDU establishment request message includes a DNN, PDU session type, session and service continuity mode, or any combination thereof.

At 362, AMF 310 may transmit a PDU establishment accept message to UE 115-*b* in response to the PDU establishment request via first subscription 205-*a*. In this way, UE 115-*b* may establish the data connection for application 315 via first subscription 205-*a* using the default policy. In some cases, the first SIM may receive the PDU establishment accept message from AMF 310 via first subscription 205-*a*.

Figure 4:
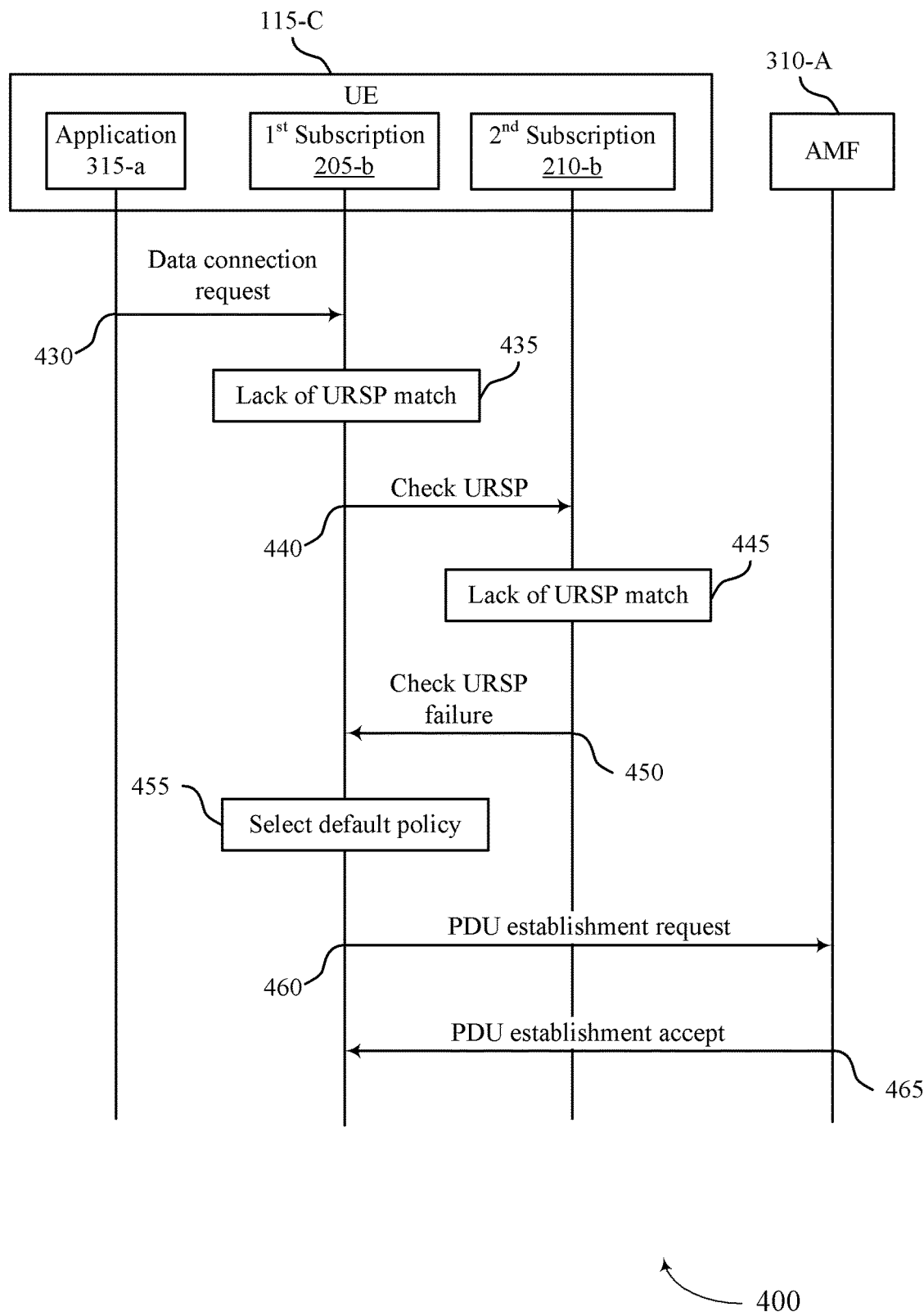
FIG. 4 illustrates an example of a process flow that supports methods to establish a PDU session in accordance with aspects of the present disclosure.

FIG. 4 illustrates an example of a process flow 400 that supports methods to establish a PDU session in accordance with aspects of the present disclosure. In some examples, process flow 400 may implement aspects of wireless communications system 100. Aspects of process flow 400 may be implemented by UE 115-*c*, which may be an example of the UEs 115 as described with respect to FIGS. 1 through 3. Additionally, UE 115-*c* may include first subscription 205-*b* and second subscription 210-*b*, which may be examples of first subscription 205 and second subscription 210 as described with reference to FIGS. 1 through 3. UE 115-*c* may communicate with AMF 310-*a* (e.g., via a base station), which may be an example of core network 130 as described with respect to FIG. 1 or an AMF 310 as described with reference to FIG. 3.

At 430, application 315-*a* may request to establish a data connection with a network. That is, application 315-*a* may transmit an indication of the data connection request to the current default subscription of UE 115-*c*, first subscription 205-*b*. Application 315-*a* may additionally indicate an access preference rule to use when establishing the data connection.

At 435, first subscription 205-*b* may determine that a URSP of first subscription 205-*b* lacks a policy that matches the access preference rule. For example, first subscription 205-*b* may compare parameters of the access preference rule (e.g., the traffic descriptors and route selection descriptors and associated precedence values) to parameters of the URSP policies (e.g., the precedence value, traffic descriptors, and route selection descriptors) and determining that the parameters of the access preference rule and the URSP policies do not match.

At 440, first subscription 205-*b* may indicate to second subscription 210-*b* to evaluate policies of a URSP of second subscription 210-*b* for a policy that matches the access preference rule indicated by application 315-*b*. For example, first subscription 205-*b* may send a check policy request message to second subscription 210-*b* indicating for second subscription 210-*b* to evaluate policies of the URSP for the matching policy.

At 445, second subscription 210-*b* may determine that the second URSP lacks a policy that matches the access preference rule. For example, second subscription 210-*b* may compare parameters of the access preference rule to parameters of the URSP policies and determining that the parameters of the access preference rules and the URSP policies do not match.

At 450, second subscription 210-*b* may indicate to first subscription 205-*b* that the second URSP lacks a matching policy. For example, second subscription 210-*b* may send a check policy failure message to first subscription 205-*b* indicating that second subscription 210-*b* lacks a matching policy.

At 455, first subscription 205-*b* may select a default policy for application 315-*b*. In some cases, the default policy includes a "match all" descriptor that is used when establishing the data connection via first subscription 205-*b*.

At 460, UE 115-*c* may transmit a PDU establishment request message to AMF 310-*a* via first subscription 205-*b*. The PDU establishment request message may indicate to AMF 310-*a* the selected default policy to use in establishing the data connection. In some cases, the PDU establishment request message includes a DNN, PDU session type, session and service continuity mode, or any combination thereof.

At 465, AMF 310-*a* may transmit a PDU establishment accept message to UE 115-*c* in response to the PDU establishment request via first subscription 205-*b*. In this way, UE 115-*c* may establish the data connection for application 315-*a* via first subscription 205-*b* using the default policy.

Figure 5:
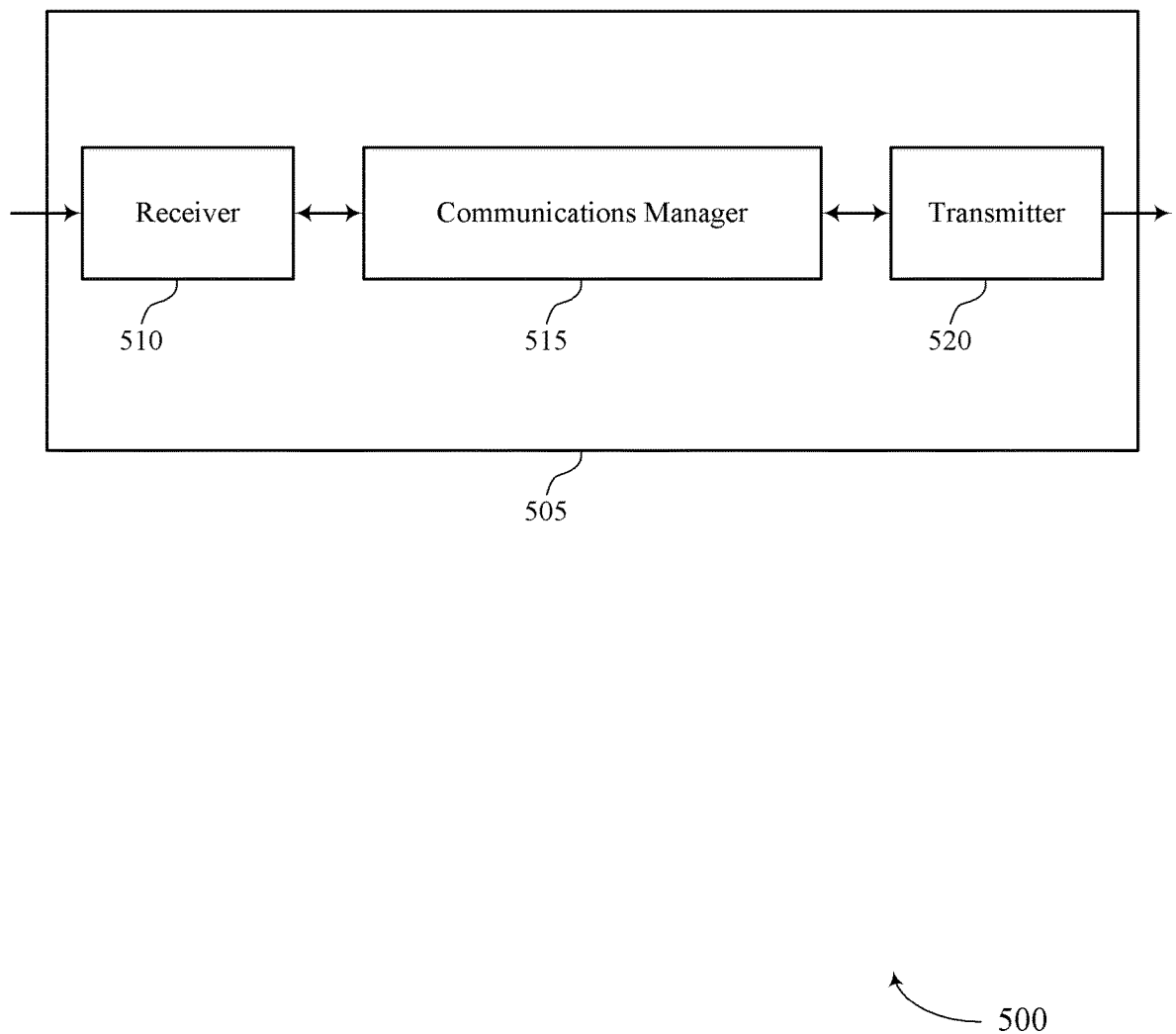
FIGS. 5 and 6 show block diagrams of devices that support methods to establish a PDU session in accordance with aspects of the present disclosure.

FIG. 5 shows a block diagram 500 of a device 505 that supports methods to establish a PDU session in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to methods to establish a PDU session, etc.). Information may be passed on to other components of the device 505. The receiver 510 may be an example of aspects of a transceiver. The receiver 510 may utilize a single antenna or a set of antennas.

The communications manager 515 may identify that the UE is operating in a dual-subscription mode that includes a first subscription and a second subscription and that the UE includes an application that is requesting to establish a data connection in accordance with an access preference rule for the application, determine that the access preference rule lacks a match among policies of a first route selection policy associated with the first subscription, evaluate, based on the lack of the match among policies of the first route selection policy, a second route selection policy associated with the second subscription for a matching policy that matches the access preference rule, and establish the data connection after evaluating the second route selection policy. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of a transceiver. The transmitter 520 may utilize a single antenna or a set of antennas.

Figure 6:
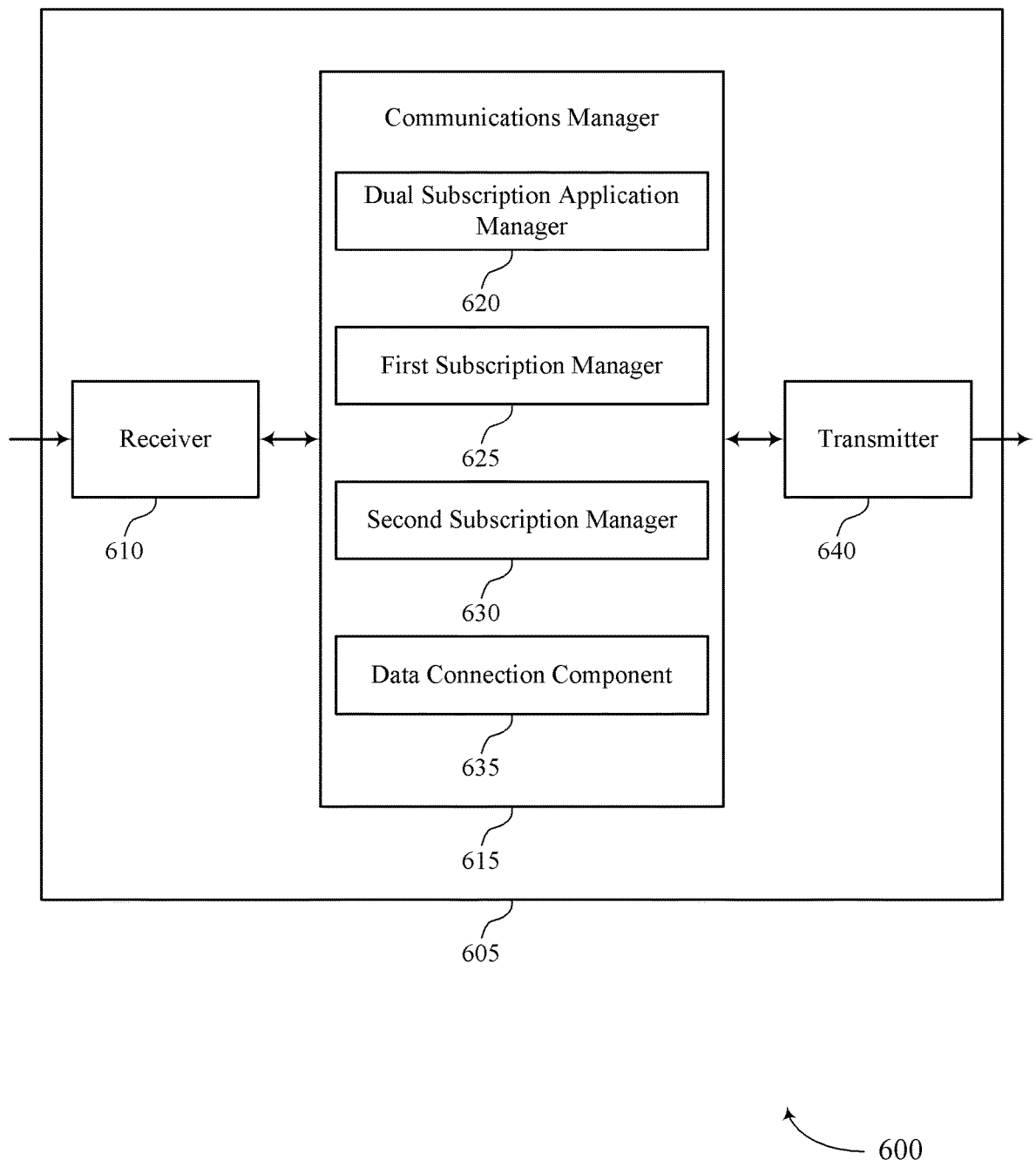

FIG. 6 shows a block diagram 600 of a device 605 that supports methods to establish a PDU session in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to methods to establish a PDU session, etc.). Information may be passed on to other components of the device 605. The receiver 610 may be an example of aspects of a transceiver. The receiver 610 may utilize a single antenna or a set of antennas.

The communications manager 615 may be an example of aspects of the communications manager 515 as described herein. The communications manager 615 may include a dual subscription application manager 620, a first subscription manager 625, a second subscription manager 630, and a data connection component 635. The communications manager 615 may be an example of aspects of the communications manager 810 described herein.

The dual subscription application manager 620 may identify that the UE is operating in a dual-subscription mode that includes a first subscription and a second subscription and that the UE includes an application that is requesting to establish a data connection in accordance with an access preference rule for the application.

The first subscription manager 625 may determine that the access preference rule lacks a match among policies of a first route selection policy associated with the first subscription.

The second subscription manager 630 may evaluate, based on the lack of the match among policies of the first route selection policy, a second route selection policy associated with the second subscription for a matching policy that matches the access preference rule.

The data connection component 635 may establish the data connection after evaluating the second route selection policy.

The transmitter 640 may transmit signals generated by other components of the device 605. In some examples, the transmitter 640 may be collocated with a receiver 610 in a transceiver module. For example, the transmitter 640 may be an example of aspects of a transceiver. The transmitter 640 may utilize a single antenna or a set of antennas.

Figure 7:
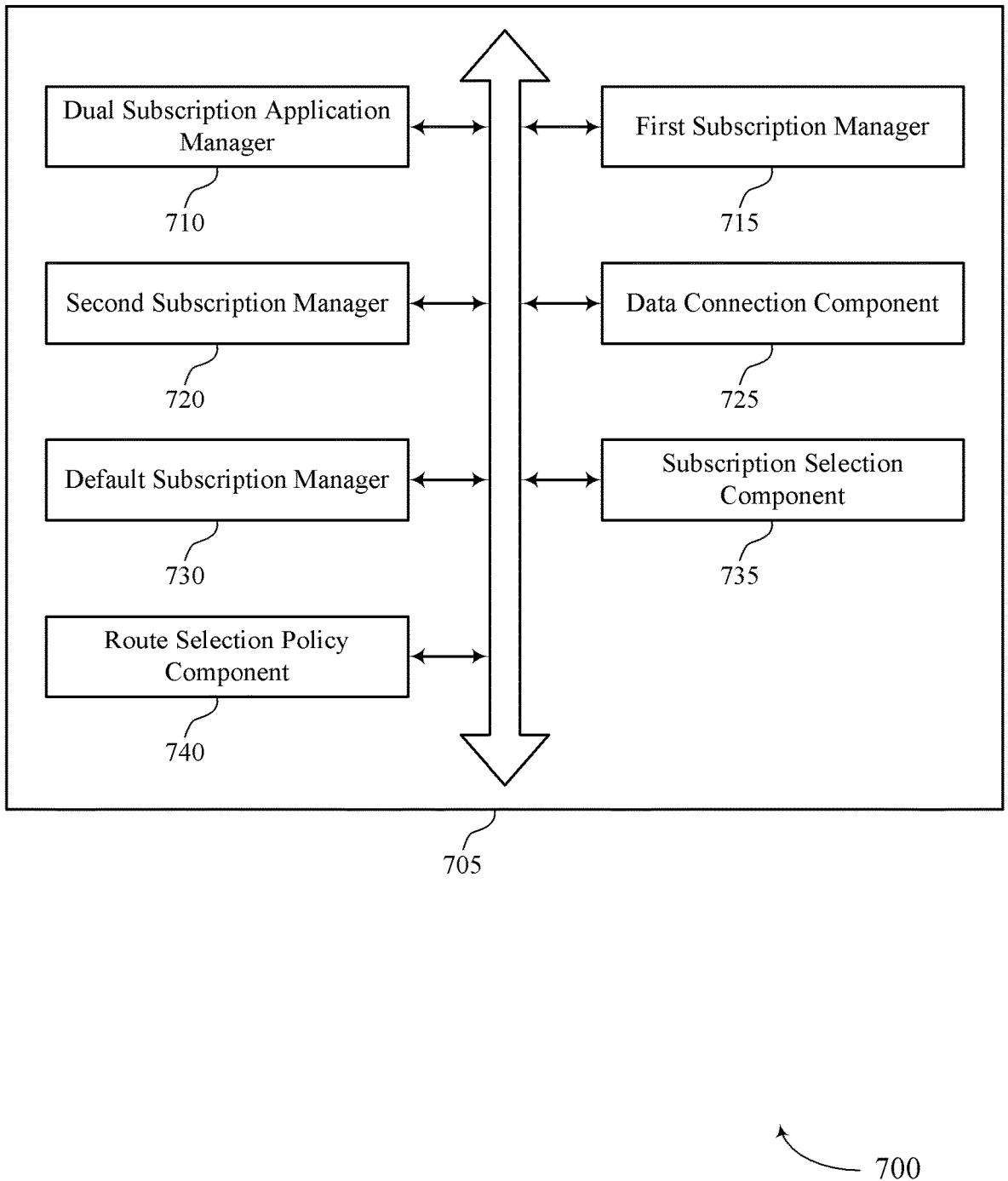
FIG. 7 shows a block diagram of a communications manager that supports methods to establish a PDU session in accordance with aspects of the present disclosure.

FIG. 7 shows a block diagram 700 of a communications manager 705 that supports methods to establish a PDU session in accordance with aspects of the present disclosure. The communications manager 705 may be an example of aspects of a communications manager 515, a communications manager 615, or a communications manager 810 described herein. The communications manager 705 may include a dual subscription application manager 710, a first subscription manager 715, a second subscription manager 720, a data connection component 725, a default subscription manager 730, a subscription selection component 735, and a route selection policy component 740. Each of these modules may communicate, directly or indirectly, with one another (e.g., via one or more buses).

The dual subscription application manager 710 may identify that the UE is operating in a dual-subscription mode that includes a first subscription and a second subscription and that the UE includes an application that is requesting to establish a data connection in accordance with an access preference rule for the application. In some cases, the first subscription is configured to provide a first data connection associated with a first quality of service for the application and the second subscription is configured to provide a second data connection associated with a second quality of service for the application, the second quality of service being of higher quality than the first quality of service.

The first subscription manager 715 may determine that the access preference rule lacks a match among policies of a first route selection policy associated with the first subscription. In some examples, the first subscription manager 715 may identify that the first subscription is a default subscription for the UE. In some instances, the first subscription manager 715 may evaluate the first route selection policy for the matching policy based on the first subscription being the default subscription.

The second subscription manager 720 may evaluate, based on the lack of the match among policies of the first route selection policy, a second route selection policy associated with the second subscription for a matching policy that matches the access preference rule. In some examples, the second subscription manager 720 may determine that the second route selection policy includes the matching policy that matches the access preference rule based on the evaluating, where the data connection is established via the second subscription based on the second route selection policy including the matching policy. In some cases, the second subscription manager 720 may determine that the second route selection policy includes the matching policy that matches the access preference rule based on the evaluating. In other cases, the second subscription manager 720 may determine that the second route selection policy lacks the matching policy that matches the access preference rule based on the evaluating.

The data connection component 725 may establish the data connection after evaluating the second route selection policy. In some examples, the data connection component 725 may establish the data connection via the second subscription based on updating a default subscription of the UE from the first subscription to the second subscription, the updating based on the second route selection policy including the matching policy. In some instances, the data connection component 725 may establish the data connection via the first subscription based on determining to maintain the first subscription as the default subscription of the UE. In some cases, the data connection component 725 may establish the data connection via the first subscription based on the second route selection policy lacking the matching policy. In some examples, the data connection component 725 may transmit a PDU establishment request message to a core network to establish the data connection. In some cases, the PDU establishment request message includes a data network name, a PDU session type, a session and service continuity mode, or a combination thereof. In some instances, the data connection component 725 may receive a PDU establishment accept message from the core network based on transmitting the PDU establishment request message.

The default subscription manager 730 may update a default subscription of the UE from the first subscription to the second subscription based on the second route selection policy including the matching policy. In some examples, the default subscription manager 730 may receive, from the user, an indication of the second subscription, where the default subscription of the UE is updated to the second subscription based on receiving the indication of the second subscription from the user. In some cases, the default subscription manager 730 may maintain the first subscription as a default subscription of the UE after determining that the second route selection policy includes the matching policy. In some instances, the default subscription manager 730 may receive, from the user, an indication of the first subscription, where maintaining the first subscription as the default subscription of the UE is based on receiving the indication of the first subscription from the user.

The subscription selection component 735 may prompt a user of the UE to select, from the first subscription and the second subscription, a default subscription of the UE based on determining that the second route selection policy includes the matching policy. In some examples, the subscription selection component 735 may prompt a user of the UE to select, from the first subscription and the second subscription, the default subscription of the UE based on determining that the second route selection policy includes the matching policy.

The route selection policy component 740 may select, from the policies of the first route selection policy, a default policy for the application, where establishing the data connection via the first subscription is based on the default policy.

Figure 8:
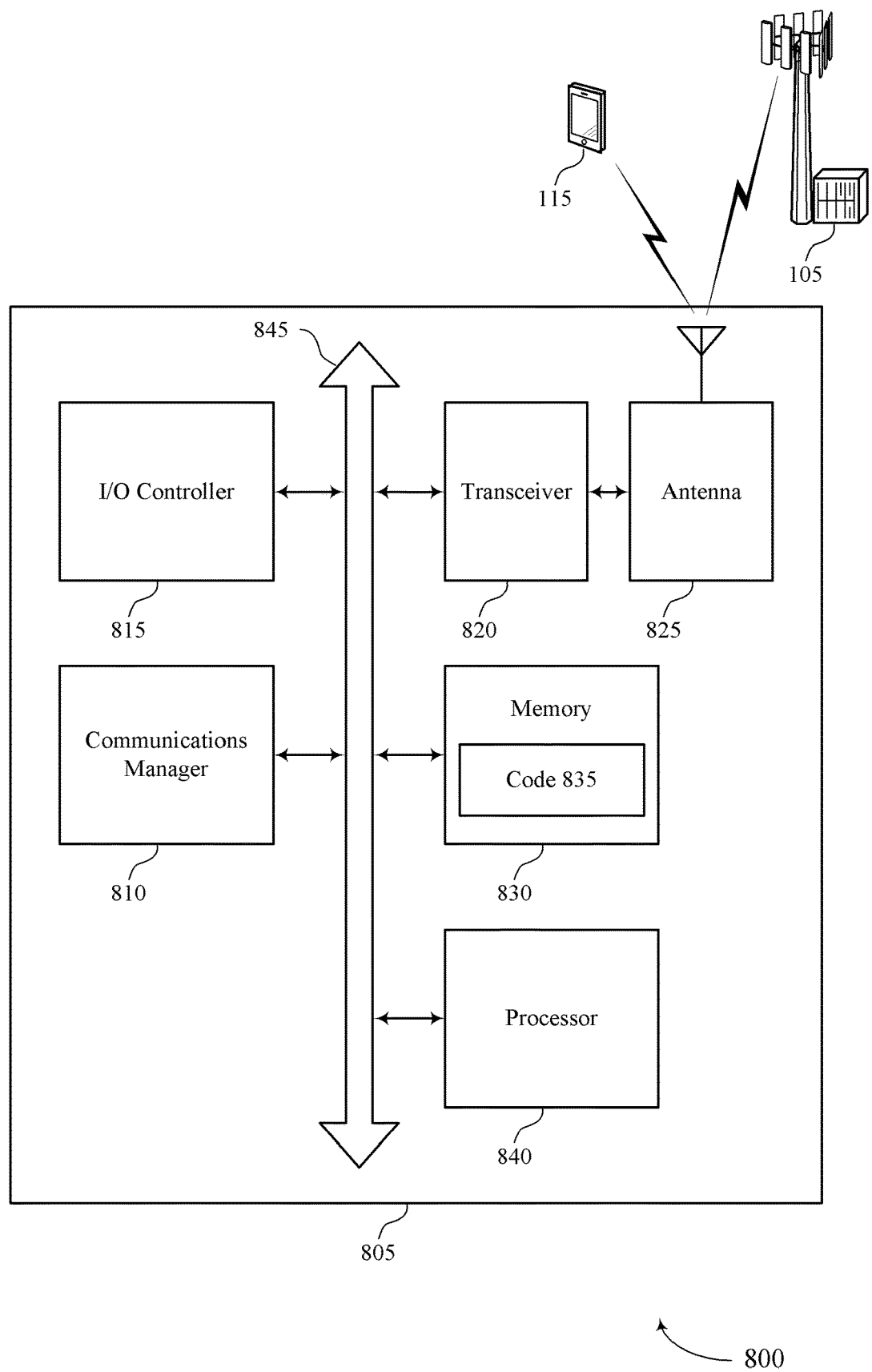
FIG. 8 shows a diagram of a system including a device that supports methods to establish a PDU session in accordance with aspects of the present disclosure.

FIG. 8 shows a diagram of a system 800 including a device 805 that supports methods to establish a PDU session in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may identify that the UE is operating in a dual-subscription mode that includes a first subscription and a second subscription and that the UE includes an application that is requesting to establish a data connection in accordance with an access preference rule for the application, determine that the access preference rule lacks a match among policies of a first route selection policy associated with the first subscription, evaluate, based on the lack of the match among policies of the first route selection policy, a second route selection policy associated with the second subscription for a matching policy that matches the access preference rule, and establish the data connection after evaluating the second route selection policy.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting SIM registration in dual-SIM device).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
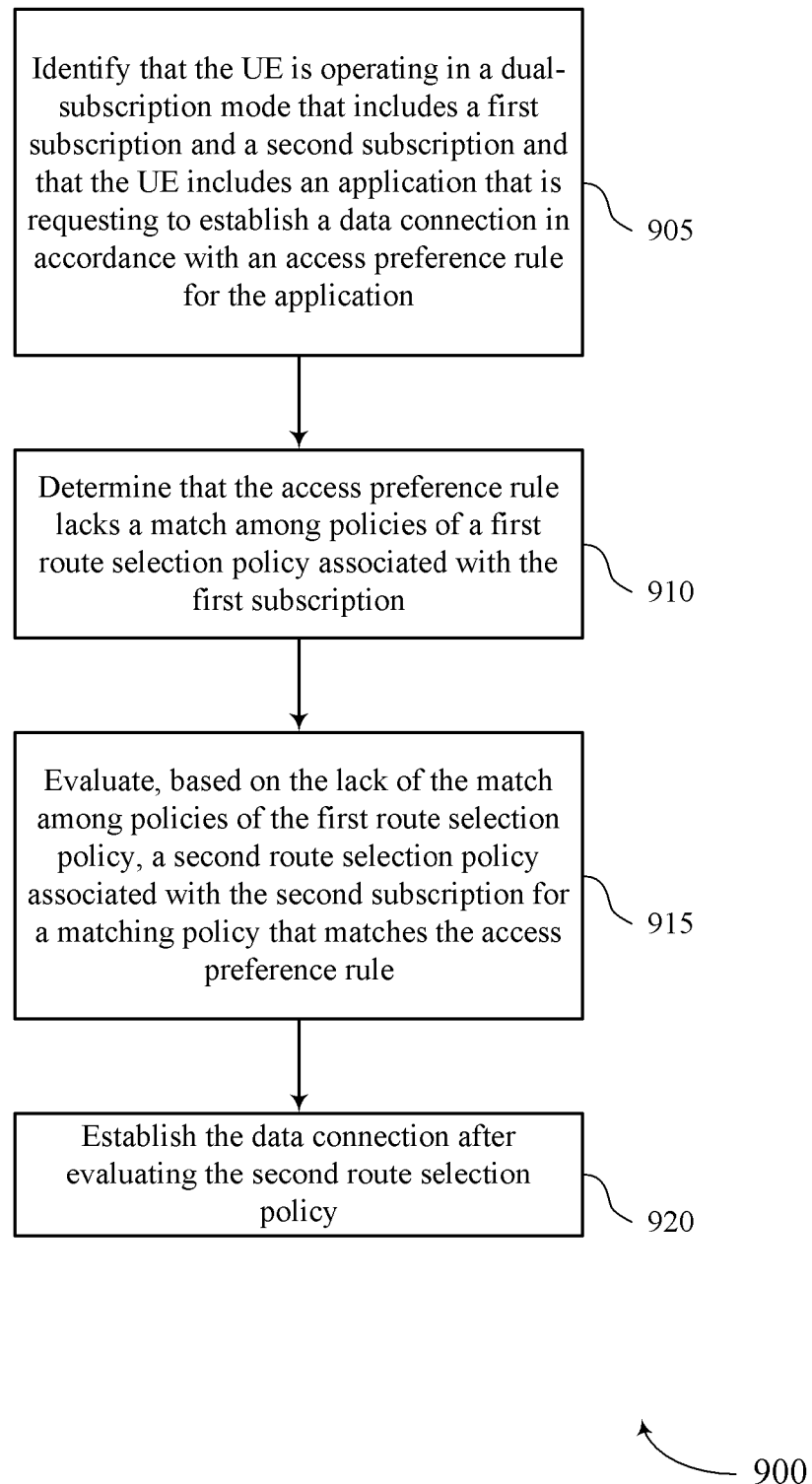
FIGS. 9 through 13 show flowcharts illustrating methods that support methods to establish a PDU session in accordance with aspects of the present disclosure.

FIG. 9 shows a flowchart illustrating a method 900 that supports methods to establish a PDU session in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may identify that the UE is operating in a dual-subscription mode that includes a first subscription and a second subscription and that the UE includes an application that is requesting to establish a data connection in accordance with an access preference rule for the application. The operations of 905 may be performed according to the methods described herein. In some examples, aspects of the operations of 905 may be performed by a dual subscription application manager as described with reference to FIGS. 5 through 8.

At 910, the UE may determine that the access preference rule lacks a match among policies of a first route selection policy associated with the first subscription. The operations of 910 may be performed according to the methods described herein. In some examples, aspects of the operations of 910 may be performed by a first subscription manager as described with reference to FIGS. 5 through 8.

At 915, the UE may evaluate, based on the lack of the match among policies of the first route selection policy, a second route selection policy associated with the second subscription for a matching policy that matches the access preference rule. The operations of 915 may be performed according to the methods described herein. In some examples, aspects of the operations of 915 may be performed by a second subscription manager as described with reference to FIGS. 5 through 8.

At 920, the UE may establish the data connection after evaluating the second route selection policy. The operations of 920 may be performed according to the methods described herein. In some examples, aspects of the operations of 920 may be performed by a data connection component as described with reference to FIGS. 5 through 8.

Figure 10:
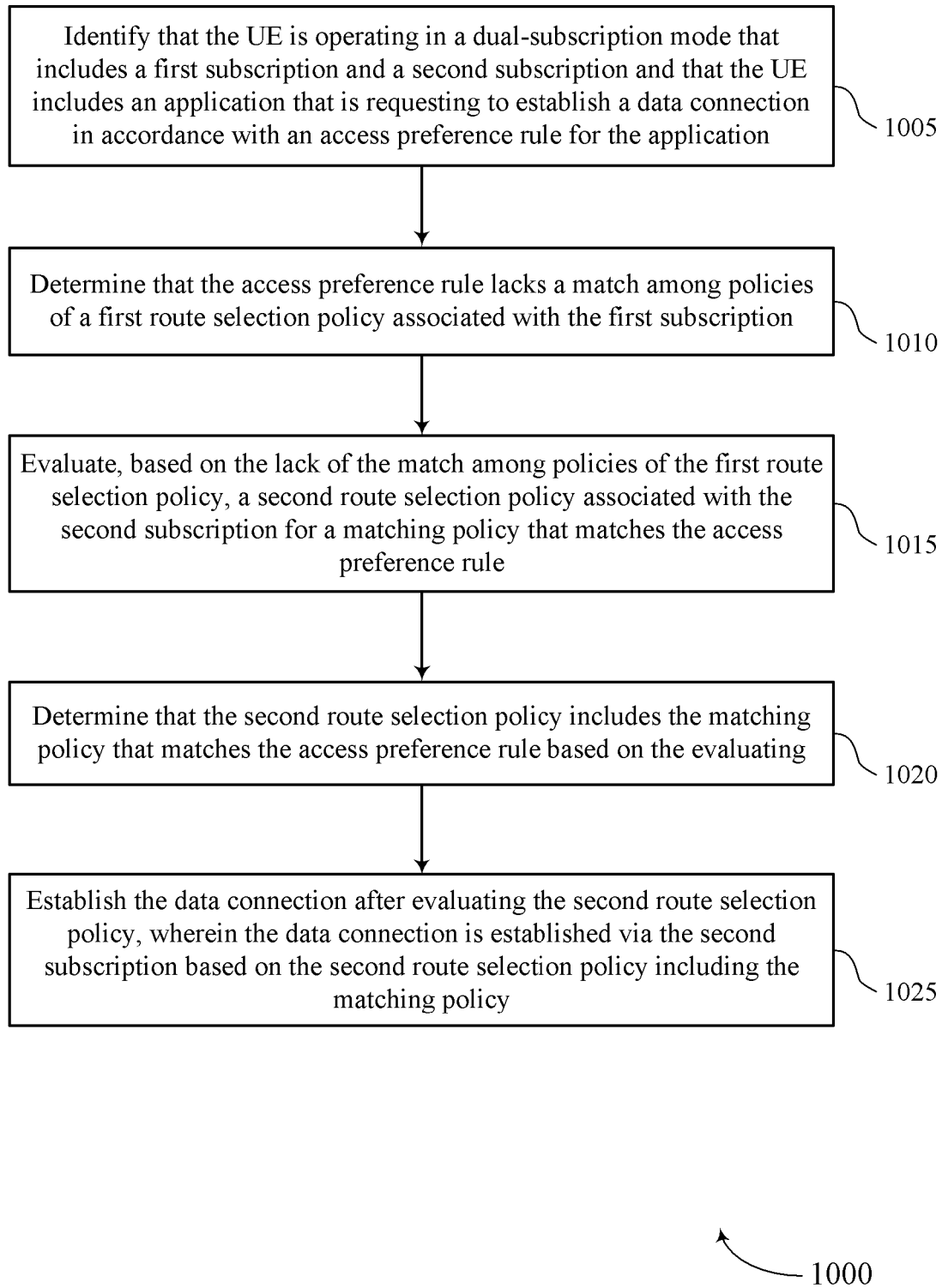

FIG. 10 shows a flowchart illustrating a method 1000 that supports methods to establish a PDU session in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may identify that the UE is operating in a dual-subscription mode that includes a first subscription and a second subscription and that the UE includes an application that is requesting to establish a data connection in accordance with an access preference rule for the application. The operations of 1005 may be performed according to the methods described herein. In some examples, aspects of the operations of 1005 may be performed by a dual subscription application manager as described with reference to FIGS. 5 through 8.

At 1010, the UE may determine that the access preference rule lacks a match among policies of a first route selection policy associated with the first subscription. The operations of 1010 may be performed according to the methods described herein. In some examples, aspects of the operations of 1010 may be performed by a first subscription manager as described with reference to FIGS. 5 through 8.

At 1015, the UE may evaluate, based on the lack of the match among policies of the first route selection policy, a second route selection policy associated with the second subscription for a matching policy that matches the access preference rule. The operations of 1015 may be performed according to the methods described herein. In some examples, aspects of the operations of 1015 may be performed by a second subscription manager as described with reference to FIGS. 5 through 8.

At 1020, the UE may determine that the second route selection policy includes the matching policy that matches the access preference rule based on the evaluating. The operations of 1020 may be performed according to the methods described herein. In some examples, aspects of the operations of 1020 may be performed by a second subscription manager as described with reference to FIGS. 5 through 8.

At 1025, the UE may establish the data connection after evaluating the second route selection policy, where the data connection is established via the second subscription based on the second route selection policy including the matching policy. The operations of 1025 may be performed according to the methods described herein. In some examples, aspects of the operations of 1025 may be performed by a data connection component as described with reference to FIGS. 5 through 8.

Figure 11:
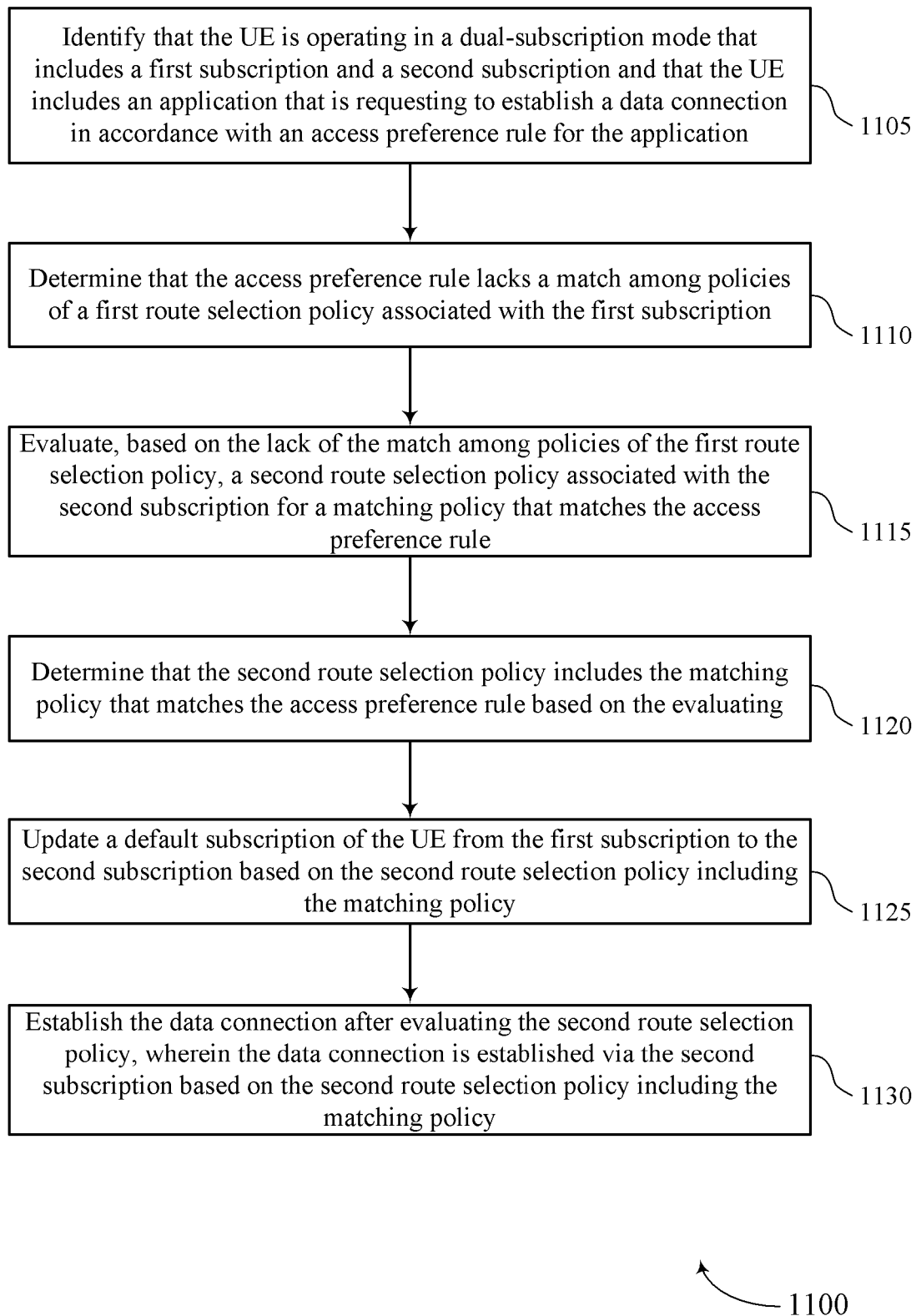

FIG. 11 shows a flowchart illustrating a method 1100 that supports methods to establish a PDU session in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may identify that the UE is operating in a dual-subscription mode that includes a first subscription and a second subscription and that the UE includes an application that is requesting to establish a data connection in accordance with an access preference rule for the application. The operations of 1105 may be performed according to the methods described herein. In some examples, aspects of the operations of 1105 may be performed by a dual subscription application manager as described with reference to FIGS. 5 through 8.

At 1110, the UE may determine that the access preference rule lacks a match among policies of a first route selection policy associated with the first subscription. The operations of 1110 may be performed according to the methods described herein. In some examples, aspects of the operations of 1110 may be performed by a first subscription manager as described with reference to FIGS. 5 through 8.

At 1115, the UE may evaluate, based on the lack of the match among policies of the first route selection policy, a second route selection policy associated with the second subscription for a matching policy that matches the access preference rule. The operations of 1115 may be performed according to the methods described herein. In some examples, aspects of the operations of 1115 may be performed by a second subscription manager as described with reference to FIGS. 5 through 8.

At 1120, the UE may determine that the second route selection policy includes the matching policy that matches the access preference rule based on the evaluating. The operations of 1120 may be performed according to the methods described herein. In some examples, aspects of the operations of 1120 may be performed by a second subscription manager as described with reference to FIGS. 5 through 8.

At 1125, the UE may update a default subscription of the UE from the first subscription to the second subscription based on the second route selection policy including the matching policy. The operations of 1125 may be performed according to the methods described herein. In some examples, aspects of the operations of 1125 may be performed by a default subscription manager as described with reference to FIGS. 5 through 8.

At 1130, the UE may establish the data connection after evaluating the second route selection policy, where the data connection is established via the second subscription based on the second route selection policy including the matching policy. The operations of 1130 may be performed according to the methods described herein. In some examples, aspects of the operations of 1130 may be performed by a data connection component as described with reference to FIGS. 5 through 8.

Figure 12:
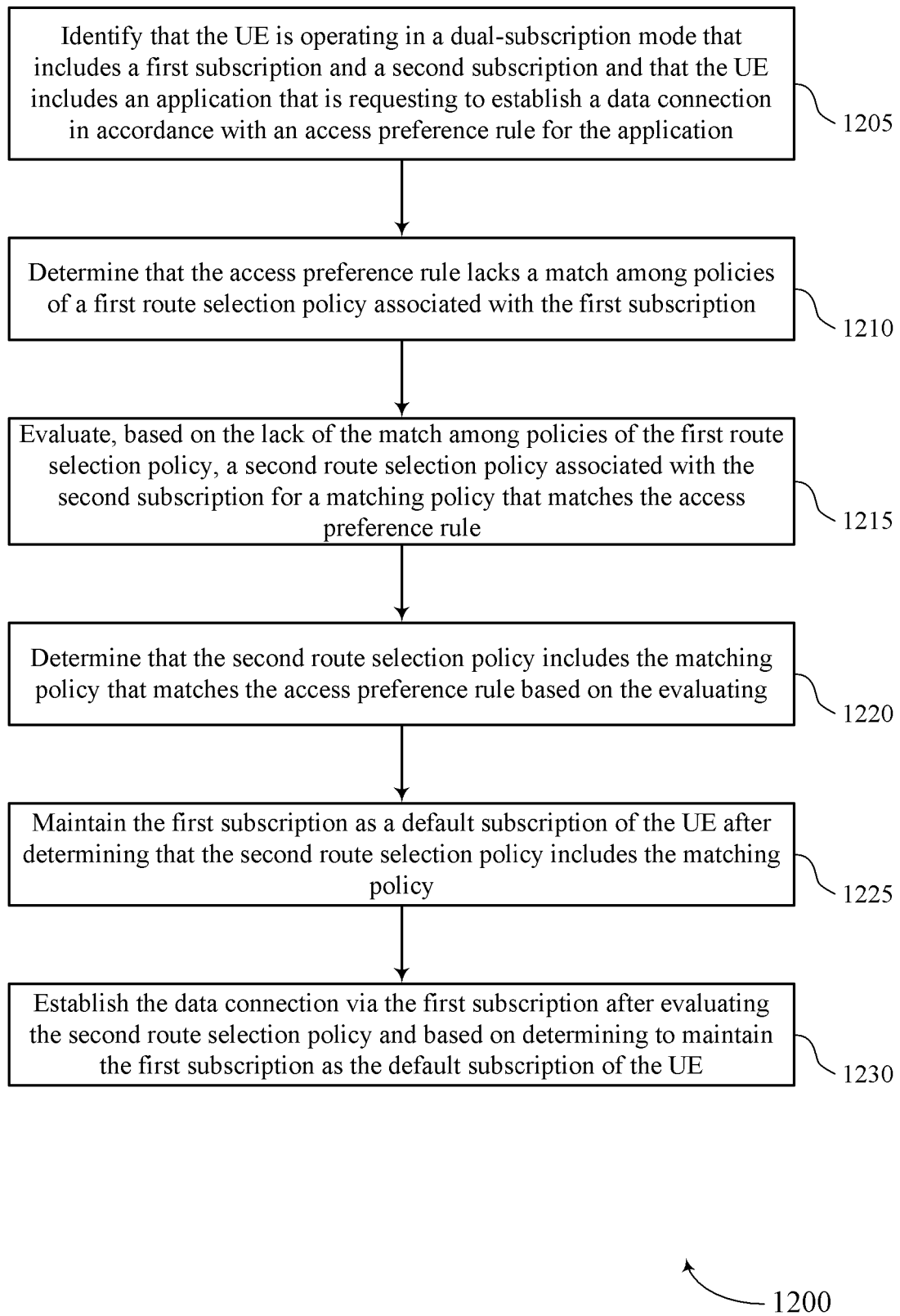

FIG. 12 shows a flowchart illustrating a method 1200 that supports methods to establish a PDU session in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may identify that the UE is operating in a dual-subscription mode that includes a first subscription and a second subscription and that the UE includes an application that is requesting to establish a data connection in accordance with an access preference rule for the application. The operations of 1205 may be performed according to the methods described herein. In some examples, aspects of the operations of 1205 may be performed by a dual subscription application manager as described with reference to FIGS. 5 through 8.

At 1210, the UE may determine that the access preference rule lacks a match among policies of a first route selection policy associated with the first subscription. The operations of 1210 may be performed according to the methods described herein. In some examples, aspects of the operations of 1210 may be performed by a first subscription manager as described with reference to FIGS. 5 through 8.

At 1215, the UE may evaluate, based on the lack of the match among policies of the first route selection policy, a second route selection policy associated with the second subscription for a matching policy that matches the access preference rule. The operations of 1215 may be performed according to the methods described herein. In some examples, aspects of the operations of 1215 may be performed by a second subscription manager as described with reference to FIGS. 5 through 8.

At 1220, the UE may determine that the second route selection policy includes the matching policy that matches the access preference rule based on the evaluating. The operations of 1220 may be performed according to the methods described herein. In some examples, aspects of the operations of 1220 may be performed by a second subscription manager as described with reference to FIGS. 5 through 8.

At 1225, the UE may maintain the first subscription as a default subscription of the UE after determining that the second route selection policy includes the matching policy. The operations of 1225 may be performed according to the methods described herein. In some examples, aspects of the operations of 1225 may be performed by a default subscription manager as described with reference to FIGS. 5 through 8.

At 1230, the UE may establish the data connection via the first subscription after evaluating the second route selection policy and based on determining to maintain the first subscription as the default subscription of the UE. The operations of 1230 may be performed according to the methods described herein. In some examples, aspects of the operations of 1230 may be performed by a data connection component as described with reference to FIGS. 5 through 8.

Figure 13:
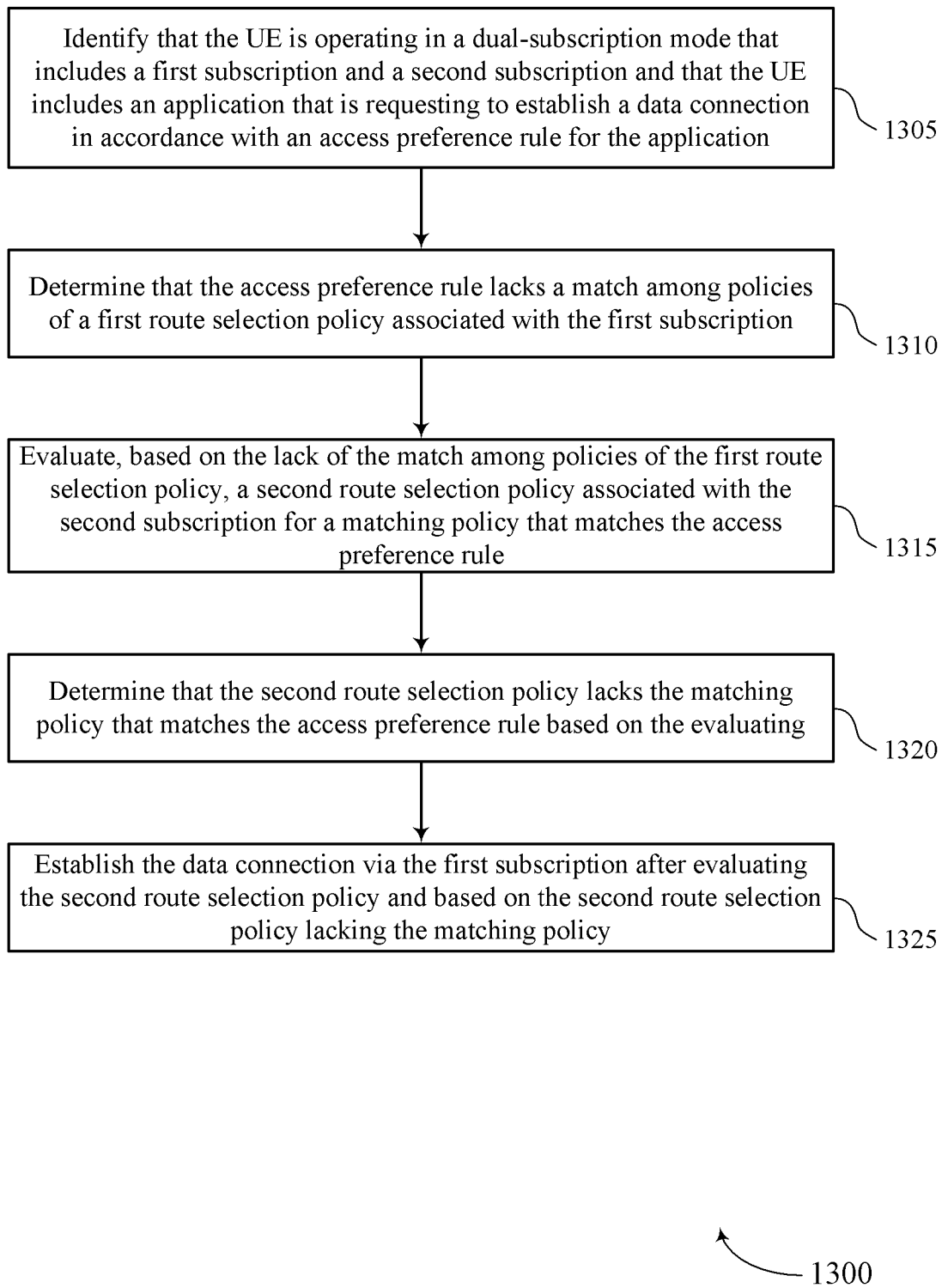

FIG. 13 shows a flowchart illustrating a method 1300 that supports methods to establish a PDU session in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may identify that the UE is operating in a dual-subscription mode that includes a first subscription and a second subscription and that the UE includes an application that is requesting to establish a data connection in accordance with an access preference rule for the application. The operations of 1305 may be performed according to the methods described herein. In some examples, aspects of the operations of 1305 may be performed by a dual subscription application manager as described with reference to FIGS. 5 through 8.

At 1310, the UE may determine that the access preference rule lacks a match among policies of a first route selection policy associated with the first subscription. The operations of 1310 may be performed according to the methods described herein. In some examples, aspects of the operations of 1310 may be performed by a first subscription manager as described with reference to FIGS. 5 through 8.

At 1315, the UE may evaluate, based on the lack of the match among policies of the first route selection policy, a second route selection policy associated with the second subscription for a matching policy that matches the access preference rule. The operations of 1315 may be performed according to the methods described herein. In some examples, aspects of the operations of 1315 may be performed by a second subscription manager as described with reference to FIGS. 5 through 8.

At 1320, the UE may determine that the second route selection policy lacks the matching policy that matches the access preference rule based on the evaluating. The operations of 1320 may be performed according to the methods described herein. In some examples, aspects of the operations of 1320 may be performed by a second subscription manager as described with reference to FIGS. 5 through 8.

At 1325, the UE may establish the data connection via the first subscription after evaluating the second route selection policy and based on the second route selection policy lacking the matching policy. The operations of 1325 may be performed according to the methods described herein. In some examples, aspects of the operations of 1325 may be performed by a data connection component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Example 1: A method for wireless communication at UE, comprising: identifying that the UE is operating in a dual-subscription mode that includes a first subscription and a second subscription and that the UE includes an application that is requesting to establish a data connection in accordance with an access preference rule for the application; determining that the access preference rule lacks a match among policies of a first route selection policy associated with the first subscription; evaluating, based at least in part on the lack of the match among policies of the first route selection policy, a second route selection policy associated with the second subscription for a matching policy that matches the access preference rule; and establishing the data connection after evaluating the second route selection policy.

Example 2: The method of example 1, further comprising: determining that the second route selection policy comprises the matching policy that matches the access preference rule based at least in part on the evaluating, wherein the data connection is established via the second subscription based at least in part on the second route selection policy comprising the matching policy.

Example 3: The method of any of examples 1 or 2, further comprising: updating a default subscription of the UE from the first subscription to the second subscription based at least in part on the second route selection policy comprising the matching policy.

Example 4: The method of any of examples 1 to 3, further comprising: prompting a user of the UE to select, from the first subscription and the second subscription, a default subscription of the UE based at least in part on determining that the second route selection policy comprises the matching policy; and receiving, from the user, an indication of the second subscription, wherein the default subscription of the UE is updated to the second subscription based at least in part on receiving the indication of the second subscription from the user.

Example 5: The method of any of examples 1 to 4, further comprising: establishing the data connection via the second subscription based at least in part on updating a default subscription of the UE from the first subscription to the second subscription, the updating based at least in part on the second route selection policy comprising the matching policy.

Example 6: The method of any of examples 1 to 5, further comprising: determining that the second route selection policy comprises the matching policy that matches the access preference rule based at least in part on the evaluating; maintaining the first subscription as a default subscription of the UE after determining that the second route selection policy comprises the matching policy; and establishing the data connection via the first subscription based at least in part on determining to maintain the first subscription as the default subscription of the UE.

Example 7: The method of any of examples 1 to 6, further comprising: prompting a user of the UE to select, from the first subscription and the second subscription, the default subscription of the UE based at least in part on determining that the second route selection policy comprises the matching policy; and receiving, from the user, an indication of the first subscription, wherein maintaining the first subscription as the default subscription of the UE is based at least in part on receiving the indication of the first subscription from the user.

Example 8: The method of any of examples 1 to 7, further comprising: selecting, from the policies of the first route selection policy, a default policy for the application, wherein establishing the data connection via the first subscription is based at least in part on the default policy.

Example 9: The method of any of examples 1 to 8, further comprising: determining that the second route selection policy lacks the matching policy that matches the access preference rule based at least in part on the evaluating; and establishing the data connection via the first subscription based at least in part on the second route selection policy lacking the matching policy.

Example 10: The method of any of examples 1 to 9, further comprising: selecting, from the policies of the first route selection policy, a default policy for the application, wherein establishing the data connection via the first subscription is based at least in part on the default policy Example 11: The method of any of examples 1 to 10, further comprising: identifying that the first subscription is a default subscription for the UE; and evaluating the first route selection policy for the matching policy based at least in part on the first subscription being the default subscription.

Example 12: The method of any of examples 1 to 11, wherein the first subscription is configured to provide a first data connection associated with a first quality of service for the application and the second subscription is configured to provide a second data connection associated with a second quality of service for the application, the second quality of service being of higher quality than the first quality of service.

Example 13: The method of any of examples 1 to 12, further comprising: transmitting a PDU establishment request message to a core network to establish the data connection; and receiving a PDU establishment accept message from the core network based at least in on transmitting the PDU establishment request message.

Example 14: The method of any of examples 1 to 13, wherein the PDU establishment request message comprises a data network name, a PDU session type, a session and service continuity mode, or a combination thereof.

Example 15: An apparatus comprising at least one means for performing a method of any of examples 1 to 14.

Example 16: An apparatus for wireless communications at a UE comprising: a processor; memory coupled with the processor, and instructions stored in the memory and executable by the processor to cause the apparatus to perform a method of any of examples 1 to 14.

Example 17: A non-transitory computer-readable medium storing code for wireless communications at a UE, the code comprising instructions executable by a processor to perform a method of any of examples 1 to 14.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    identifying that the UE is operating in a dual-subscription mode that includes a first subscription and a second subscription and that the UE includes an application that is requesting to establish a data connection in accordance with an access preference rule for the application;
    determining that the access preference rule lacks a match among policies of a first route selection policy associated with the first subscription;
    evaluating, based at least in part on the lack of the match among policies of the first route selection policy, a second route selection policy associated with the second subscription for a matching policy that matches the access preference rule;
    determining that the second route selection policy comprises the matching policy that matches the access preference rule based at least in part on the evaluating, wherein the data connection is established via the second subscription based at least in part on the second route selection policy comprising the matching policy;
    updating a default subscription of the UE from the first subscription to the second subscription based at least in part on the second route selection policy comprising the matching policy; and
    establishing the data connection after evaluating the second route selection policy.

2. The method of claim 1, further comprising:
    prompting a user of the UE to select, from the first subscription and the second subscription, a default subscription of the UE based at least in part on determining that the second route selection policy comprises the matching policy; and
    receiving, from the user, an indication of the second subscription, wherein the default subscription of the UE is updated to the second subscription based at least in part on receiving the indication of the second subscription from the user.

3. The method of claim 1, further comprising:
    establishing the data connection via the second subscription based at least in part on updating a default subscription of the UE from the first subscription to the second subscription, the updating based at least in part on the second route selection policy comprising the matching policy.

4. The method of claim 1, further comprising:
determining that the second route selection policy comprises the matching policy that matches the access preference rule based at least in part on the evaluating;
maintaining the first subscription as a default subscription of the UE after determining that the second route selection policy comprises the matching policy; and
establishing the data connection via the first subscription based at least in part on determining to maintain the first subscription as the default subscription of the UE.

5. The method of claim 4, further comprising:
prompting a user of the UE to select, from the first subscription and the second subscription, the default subscription of the UE based at least in part on determining that the second route selection policy comprises the matching policy; and
receiving, from the user, an indication of the first subscription, wherein maintaining the first subscription as the default subscription of the UE is based at least in part on receiving the indication of the first subscription from the user.

6. The method of claim 4, further comprising:
selecting, from the policies of the first route selection policy, a default policy for the application, wherein establishing the data connection via the first subscription is based at least in part on the default policy.

7. The method of claim 1, further comprising:
determining that the second route selection policy lacks the matching policy that matches the access preference rule based at least in part on the evaluating; and
establishing the data connection via the first subscription based at least in part on the second route selection policy lacking the matching policy.

8. The method of claim 7, further comprising:
selecting, from the policies of the first route selection policy, a default policy for the application, wherein establishing the data connection via the first subscription is based at least in part on the default policy.

9. The method of claim 1, further comprising:
identifying that the first subscription is a default subscription for the UE; and
evaluating the first route selection policy for the matching policy based at least in part on the first subscription being the default subscription.

10. The method of claim 1, wherein the first subscription is configured to provide a first data connection associated with a first quality of service for the application and the second subscription is configured to provide a second data connection associated with a second quality of service for the application, the second quality of service being of higher quality than the first quality of service.

11. The method of claim 1, wherein establishing the data connection further comprises:
transmitting a protocol data unit establishment request message to a core network to establish the data connection; and
receiving a protocol data unit establishment accept message from the core network based at least in on transmitting the protocol data unit establishment request message.

12. The method of claim 11, wherein the protocol data unit establishment request message comprises a data network name, a protocol data unit session type, a session and service continuity mode, or a combination thereof.

13. An apparatus for wireless communication at a user equipment (UE), comprising:
a processor,
memory coupled with the processor; and
instructions stored in the memory and executable by the processor to cause the apparatus to:
identify that the UE is operating in a dual-subscription mode that includes a first subscription and a second subscription and that the UE includes an application that is requesting to establish a data connection in accordance with an access preference rule for the application;
determine that the access preference rule lacks a match among policies of a first route selection policy associated with the first subscription;
evaluate, based at least in part on the lack of the match among policies of the first route selection policy, a second route selection policy associated with the second subscription for a matching policy that matches the access preference rule;
determine that the second route selection policy comprises the matching policy that matches the access preference rule based at least in part on the evaluating, wherein the data connection is established via the second subscription based at least in part on the second route selection policy comprising the matching policy;
update a default subscription of the UE from the first subscription to the second subscription based at least in part on the second route selection policy comprising the matching policy; and
establish the data connection after evaluating the second route selection policy.

14. The apparatus of claim 13, wherein the instructions are further executable by the processor to cause the apparatus to:
prompt a user of the UE to select, from the first subscription and the second subscription, a default subscription of the UE based at least in part on determining that the second route selection policy comprises the matching policy; and
receive, from the user, an indication of the second subscription, wherein the default subscription of the UE is updated to the second subscription based at least in part on receiving the indication of the second subscription from the user.

15. The apparatus of claim 13, wherein the instructions are further executable by the processor to cause the apparatus to:
establish the data connection via the second subscription based at least in part on updating a default subscription of the UE from the first subscription to the second subscription, the updating based at least in part on the second route selection policy comprising the matching policy.

16. The apparatus of claim 13, wherein the instructions are further executable by the processor to cause the apparatus to:
determine that the second route selection policy comprises the matching policy that matches the access preference rule based at least in part on the evaluating;
maintain the first subscription as a default subscription of the UE after determining that the second route selection policy comprises the matching policy; and
establish the data connection via the first subscription based at least in part on determining to maintain the first subscription as the default subscription of the UE.

17. The apparatus of claim 16, wherein the instructions are further executable by the processor to cause the apparatus to:
prompt a user of the UE to select, from the first subscription and the second subscription, the default subscription of the UE based at least in part on determining that the second route selection policy comprises the matching policy; and
receive, from the user, an indication of the first subscription, wherein maintaining the first subscription as the default subscription of the UE is based at least in part on receiving the indication of the first subscription from the user.

18. The apparatus of claim 16, wherein the instructions are further executable by the processor to cause the apparatus to:
select, from the policies of the first route selection policy, a default policy for the application, wherein establishing the data connection via the first subscription is based at least in part on the default policy.

19. The apparatus of claim 13, wherein the instructions are further executable by the processor to cause the apparatus to:
determine that the second route selection policy lacks the matching policy that matches the access preference rule based at least in part on the evaluating; and
establish the data connection via the first subscription based at least in part on the second route selection policy lacking the matching policy.

20. The apparatus of claim 19, wherein the instructions are further executable by the processor to cause the apparatus to:
select, from the policies of the first route selection policy, a default policy for the application, wherein establishing the data connection via the first subscription is based at least in part on the default policy.

21. The apparatus of claim 13, wherein the instructions are further executable by the processor to cause the apparatus to:
identify that the first subscription is a default subscription for the UE; and
evaluate the first route selection policy for the matching policy based at least in part on the first subscription being the default subscription.

22. The apparatus of claim 13, wherein the first subscription is configured to provide a first data connection associated with a first quality of service for the application and the second subscription is configured to provide a second data connection associated with a second quality of service for the application, the second quality of service being of higher quality than the first quality of service.

23. The apparatus of claim 13, wherein the instructions to establish the data connection further are executable by the processor to cause the apparatus to:
transmit a protocol data unit establishment request message to a core network to establish the data connection; and
receive a protocol data unit establishment accept message from the core network based at least in on transmitting the protocol data unit establishment request message.

24. The apparatus of claim 23, wherein the protocol data unit establishment request message comprises a data network name, a protocol data unit session type, a session and service continuity mode, or a combination thereof.

25. An apparatus for wireless communication at a user equipment (UE), comprising:
means for identifying that the UE is operating in a dual-subscription mode that includes a first subscription and a second subscription and that the UE includes an application that is requesting to establish a data connection in accordance with an access preference rule for the application;
means for determining that the access preference rule lacks a match among policies of a first route selection policy associated with the first subscription;
means for evaluating, based at least in part on the lack of the match among policies of the first route selection policy, a second route selection policy associated with the second subscription for a matching policy that matches the access preference rule;
means for determining that the second route selection policy comprises the matching policy that matches the access preference rule based at least in part on the evaluating, wherein the data connection is established via the second subscription based at least in part on the second route selection policy comprising the matching policy;
means for updating a default subscription of the UE from the first subscription to the second subscription based at least in part on the second route selection policy comprising the matching policy; and
means for establishing the data connection after evaluating the second route selection policy.

26. A non-transitory computer-readable medium storing code for wireless communication at a user equipment (UE), the code comprising instructions executable by a processor to:
identify that the UE is operating in a dual-subscription mode that includes a first subscription and a second subscription and that the UE includes an application that is requesting to establish a data connection in accordance with an access preference rule for the application;
determine that the access preference rule lacks a match among policies of a first route selection policy associated with the first subscription;
evaluate, based at least in part on the lack of the match among policies of the first route selection policy, a second route selection policy associated with the second subscription for a matching policy that matches the access preference rule;
determine that the second route selection policy comprises the matching policy that matches the access preference rule based at least in part on the evaluating, wherein the data connection is established via the second subscription based at least in part on the second route selection policy comprising the matching policy;
update a default subscription of the UE from the first subscription to the second subscription based at least in part on the second route selection policy comprising the matching policy; and
establish the data connection after evaluating the second route selection policy.

* * * * *